US009471849B2

United States Patent
Gurwicz et al.

(10) Patent No.: US 9,471,849 B2
(45) Date of Patent: Oct. 18, 2016

(54) SYSTEM AND METHOD FOR SUSPECT SEARCH

(71) Applicant: NICE-SYSTEMS LTD., Ra'anana (IL)

(72) Inventors: Yaniv Gurwicz, Givataim (IL); Raanan Yonatan Yehezkel, Kiryat Ekron (IL); Vladimir Goldner, Tel Aviv (IL); Guy Boudoukh, Ramat Hasharon (IL); Guy Blumstein-Koren, Tel Mond (IL); Doron Girmonsky, Ra'anana (IL)

(73) Assignee: Qognify Ltd., Ra'anana (IL)

( * ) Notice: Subject to any disclaimer, the term of this patent is extended or adjusted under 35 U.S.C. 154(b) by 223 days.

(21) Appl. No.: 14/109,995

(22) Filed: Dec. 18, 2013

(65) Prior Publication Data
US 2014/0328512 A1 Nov. 6, 2014

(30) Foreign Application Priority Data
May 5, 2013 (IL) .......................................... 226175

(51) Int. Cl.
G06K 9/00 (2006.01)
G06K 9/62 (2006.01)

(52) U.S. Cl.
CPC ......... G06K 9/6263 (2013.01); G06K 9/00771 (2013.01)

(58) Field of Classification Search
None
See application file for complete search history.

(56) References Cited

U.S. PATENT DOCUMENTS

2011/0320495 A1* 12/2011 Levy-Yurista ............ G01S 5/02
707/780
2013/0155229 A1* 6/2013 Thornton ................. H04N 7/18
348/143
2013/0287250 A1* 10/2013 Lee .................... G06K 9/00362
382/103

OTHER PUBLICATIONS

Farenzena, Michela, et al. "Person re-identification by symmetry-driven accumulation of local features." Computer Vision and Pattern Recognition (CVPR), 2010 IEEE Conference on. IEEE, 2010.*
Pham, Thang V., Marcel Worring, and Arnold WM Smeulders. "A multi-camera visual surveillance system for tracking of reoccurrences of people." Distributed Smart Cameras, 2007. ICDSC'07. First ACM/IEEE International Conference on. IEEE, 2007.*
Liebig, Thomas, and Armel Ulrich Kemloh Wagoum. "Modelling Microscopic Pedestrian Mobility using Bluetooth." ICAART (2). 2012.*
Sabean, Jonathan, and Crystal Jones. "Inventory of Current Programs for Measuring Wait Times at Land Border Crossings." Transport Canada and Federal Highway Administration. May 21, 2008: 2008.*

(Continued)

Primary Examiner — Vikkram Bali
Assistant Examiner — Tracy Mangialaschi
(74) Attorney, Agent, or Firm — Pearl Cohen Zedek Latzer Baratz LLP

(57) ABSTRACT

A system and method for detecting an object of interest. A system and method may generate a first signature for an object of interest based on an image of the object of interest. A system and method may generate a second signature for a candidate object based on an image of the candidate object. A system and method may calculate a similarity score by relating the first signature to the second signature and may determine the image of the candidate object is an image of the object of interest based on the similarity score.

19 Claims, 20 Drawing Sheets

(56) References Cited

OTHER PUBLICATIONS

Satta, Riccardo, et al. "A multiple component matching framework for person re-identification." Image Analysis and Processing—ICIAP 2011. Springer Berlin Heidelberg, 2011. 140-149.*
Farenzena et al., "Person Re-Identification by Symmetry-Driven Accumulation of Local Features", 2010 IEEE Conference on Computer Vision and Pattern Recognition (CVPR), Jun. 13-18, 2010, San Francisco, CA, pp. 2360-2367.
Prosser et al., "Person Re-Identification by Support Vector Ranking", In Frèdéric Labrosse, Reyer Zwiggelaar, Yonghai Liu, and Bernie Tiddeman, editors, Proceedings of the British Machine Vision Conference, pp. 21.1-21.11, BMVA Press, Sep. 2010.
Zheng et al., "Person Re-identification by Probabilistic Relative Distane Comparison", 2011 IEEE Conference on Computer Vision and Pattern Recognition (CVPR), Jun. 20-25, 2011, Providence, RI, pp. 649-656.
Berdugo et al., "Object Reidentification in Real World Scenarios Across Multiple Non-Overlapping Cameras", 18th European Signal Processing Conference (EUSIPCO-2010), Aalborg, Denmark, Aug. 23-27, 2010, pp. 1806-1810.
Tamar Avraham and Michael Lindenbaum, "Explicit vs. Implicit Appearance Transfer for Person Re-identification", 2013, 21 pages.
Bialkowski et al., "A Database for Person Re-Identification in Multi-Camera Surveillance Networks", 2012 International Conference on Digital Image Computing Techniques and Applications (DICTA), Dec. 3-5, 2012, Fremantle, WA, pp. 1-8.
Bak et al. "Person Re-identification Using Haar-based and DCD-based Signature", Advanced Video and Signal Based Surveillance (AVSS), 2010 Seventh IEEE International Conference on, Aug. 29, 2010, pp. 1-8.
Han et al. "Matching Composite Sketches to Face Photos: A Component-Based Approach", IEEE Transactions on Information Forensics and Security, vol. 8, No. 1, pp. 191-204, Jan. 2, 2013.
Office Action of U.S. Appl. No. 14/517,856, mailed Jun. 7, 2016.

\* cited by examiner

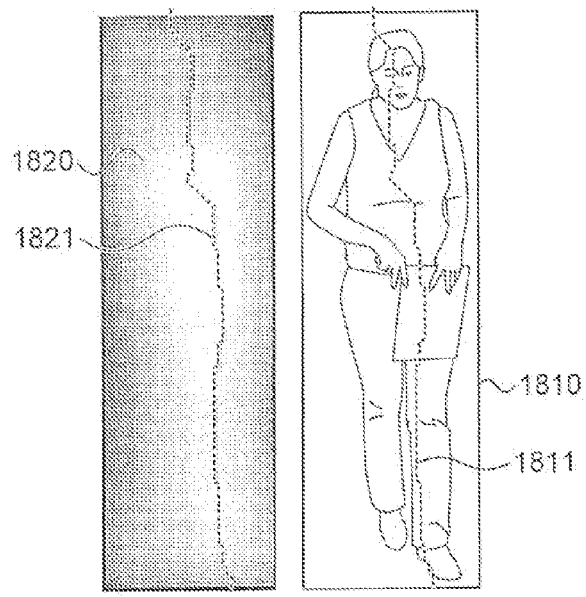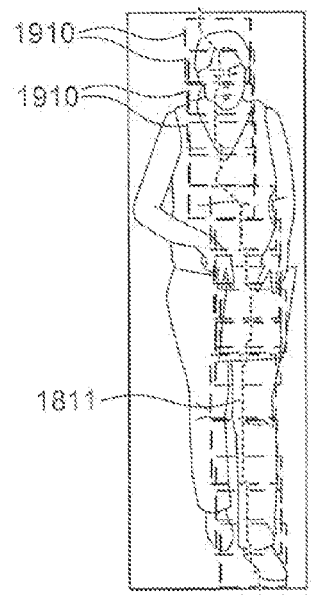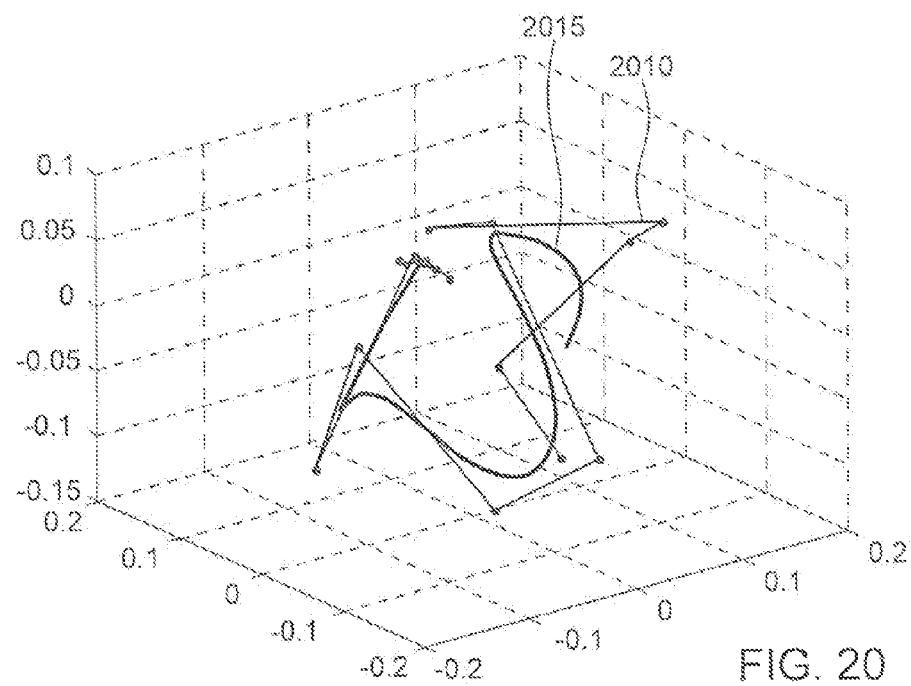

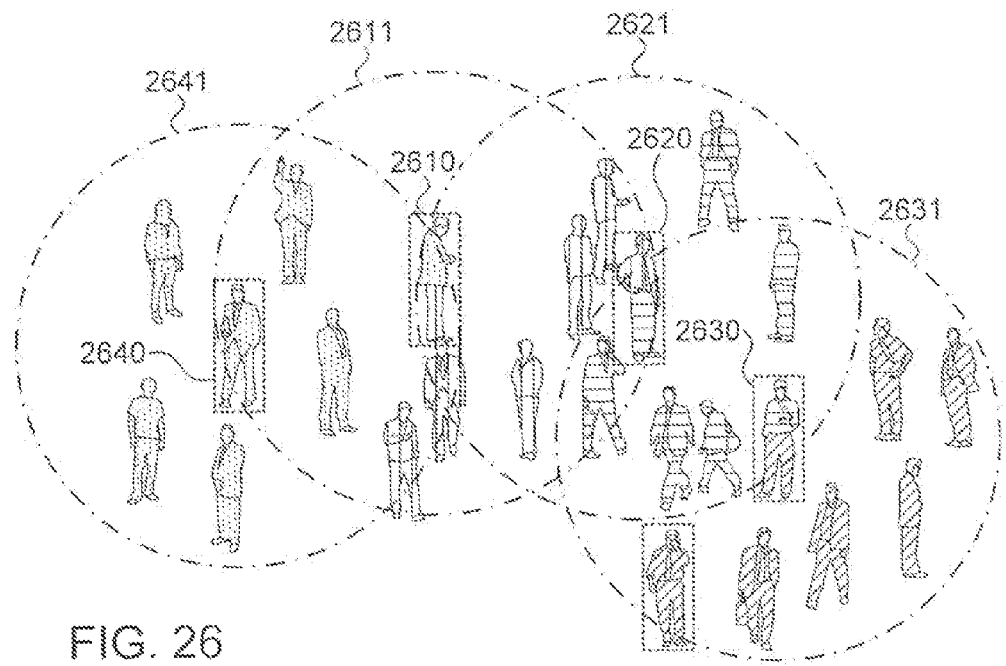
FIG. 26
FIG. 27
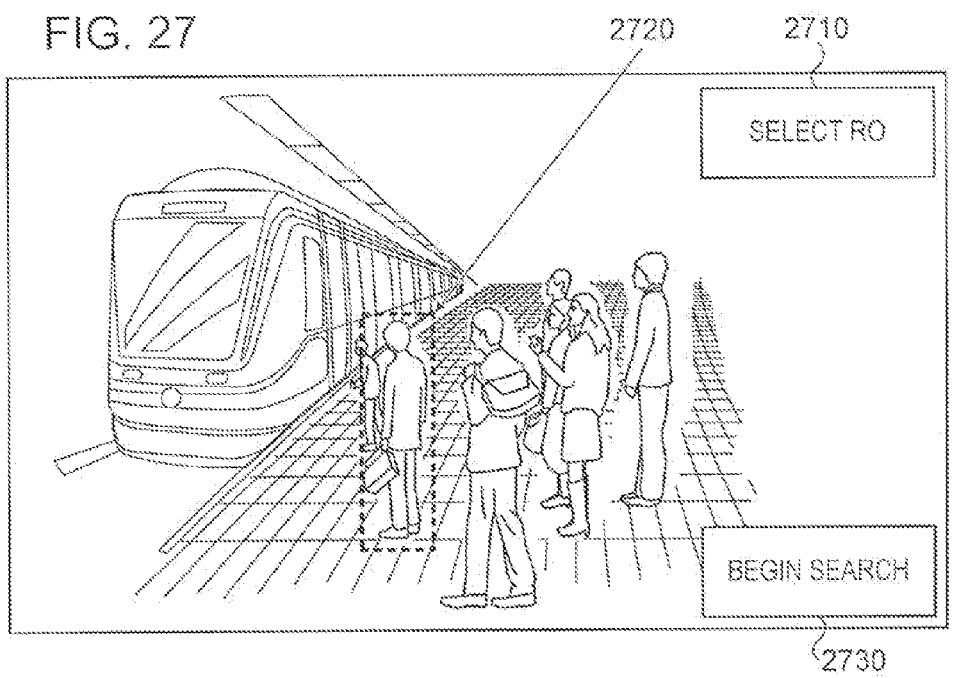

FIG. 28

- SELECT CAMERAS (MULTIPLE SELECTIONS):

| ITEM ▽ |
  |---|
  | ITEM 1 |
  | ITEM 2 |
  | ITEM 3 |
  | ITEM 4 |
  | ITEM 5 |
  | ITEM 6 |
  | ITEM 7 |
  | ITEM 8 |
  | ITEM 9 |

~2810

DEFINE SEARCH PARAMETERS

- SELECT AREAS IN SITE (MULTIPLE SELECTIONS):

| ITEM ▽ |
  |---|
  | ITEM 1 |
  | ITEM 2 |
  | ITEM 3 |
  | ITEM 4 |
  | ITEM 5 |
  | ITEM 6 |
  | ITEM 7 |
  | ITEM 8 |
  | ITEM 9 |

~2820

- SELECT TIME FOR EACH CAMERA/AREA:

| ITEM ▽ |
  |---|
  | ITEM 1 |
  | ITEM 2 |
  | ITEM 3 |
  | ITEM 4 |
  | ITEM 5 |
  | ITEM 6 |
  | ITEM 7 |
  | ITEM 8 |
  | ITEM 9 |

2831
  ☑ FROM TIME:____ TO TIME:____
  ☐ LAST:____HOURS
  ☐ FOR THE NEXT:____HOURS
  ☐ ....
  ~2830

- SELECT PROGRESSIVE SEARCH MODE (FOLLOWING THE USER FEEDBACK):
  ☐ USER SELECTS NEXT CO
  ☑ AUTO SELECT NEXT CO ACCORDING TO APPEARANCE DIVERSITY
  ☐ AUTO SELECT NEXT CO ACCORDING TO TIME INDICATOR
  ☐ AUTO SELECT NEXT CO ACCORDING TO LOCATION INDICATOR
  } 2832

SYSTEM AND METHOD FOR SUSPECT SEARCH

CROSS-REFERENCE TO RELATED APPLICATIONS

This application is a Convention foreign filing of Israel Patent Application No. 226175, filed May 5, 2013 which is hereby incorporated by reference.

FIELD OF THE INVENTION

The present invention is in the field of video surveillance. In particular, the present invention is directed to identifying and tracking a reference object.

BACKGROUND OF THE INVENTION

Video surveillance is widely used. For example, suspect search systems that identify, track and/or monitor an individual use video surveillance or video monitoring. Video Content Analysis (VCA) or video analytics are known and used, e.g., for automatic analysis of a video stream to detect or identify points of interest. Video analytics is becoming more prevalent in a wide range of domains such as security, entertainment, healthcare and surveillance.

However, known systems suffer from a number of drawbacks. Known systems use search algorithms or methods that may work well when provided with input from a single camera's field of view (FOV), but are unable to process multiple FOV's input. Other methods do process multiple FOV's, but assume clear overlaps between the FOV's, which, for most real-world scenarios, is not the case. Other known systems and methods are based on tracking, which is prone to fail in densely populated areas. Yet other systems and methods may fail when input images are acquired in varying conditions, e.g., a change in lighting, indoor/outdoor, angles, different cameras' settings, etc.

SUMMARY OF EMBODIMENTS OF THE INVENTION

An embodiment of a system or method may generate a first signature for an object of interest based on an image of the object of interest. An embodiment of the invention may generate a second signature for a candidate object based on an image of the candidate object. An embodiment of the invention may calculate a similarity score by relating the first signature to the second signature and may determine the image of the candidate object is an image of the object of interest based on the similarity score.

An embodiment of the invention may generate the first and second signatures based on images acquired by a respective first and second cameras. First and second signatures may include respective first and second sets of characteristics. Calculating a similarity score may include relating the first set of characteristics to the second set of characteristics.

Generating a signature by an embodiment of the invention may include defining a curve on an object in an image such that the curve traverses regions associated with an object in the foreground of the image; placing a plurality of areas or patches along the curve with some overlap between the patches; determining attributes of at least some of the patches; identifying sets of patches having common attributes, and generating the signature based on at least one set of patches.

An embodiment of the invention may identify background and foreground pixels in an image by defining a first region in the image, the first region including an image of the object of interest and background pixels; defining a second region in the image, the second region including the first region; designating pixels included in the second region and excluded by the first region as background pixels, and based on attributes of the background pixels, identifying additional background pixels in the first region.

An image of an object of interest may be acquired at a first location and an image of a candidate object may be acquired at a second location. An image of an object of interest may be acquired using a first field of view (FOV) and an image of a candidate object may be acquired using a second FOV, wherein the second FOV does not overlap the first FOV.

An embodiment of the invention may detect motion in a set of images and may search for an object of interest in an image only in areas where motion is detected. An embodiment of the invention may determine, for a first and second horizontal portions of an image a respective first and second object sizes and may search for an object of interest in the first and second horizontal portions based on the respective first and second object sizes.

A signature of an object of interest may be generated based on a characteristic of a device operated by the object of interest. An embodiment of the invention may generate signatures for an object of interest and for a plurality of candidate objects based on images of the object and of the plurality of candidate objects. An embodiment of the invention may select from the plurality of candidate objects, a set of candidate objects based on a set of similarity scores respectively associated with the set of candidate objects, the similarity scores calculated based on the signatures; present images of the set of candidate objects to a user; receive input from the user, the input indicating candidate objects in the set that match the object of interest, and, based on the input, an embodiment of the invention may modify the signature of the object of interest, modify at least one parameter used for generating the signature or modify at least one parameter used for calculating a similarity score.

An embodiment of the invention may generate a signature based on a user identification attached to messages related to a social network.

An embodiment of the invention may use a user identification attached to a message related to a social network to access information in a social network, the information related to the object of interest or to a candidate object. An embodiment of the invention may generate a profile of an object of interest based on information in a social network.

An embodiment of the invention may generate signatures of an object of interest and candidate object such that the signatures are invariant to at least one of: a scaling of an image, an orientation of the object in an image, a light intensity in an image, an angle and a deformation of the object in an image and a color temperature of a light source.

An embodiment of the invention may select, from a set of candidate objects that are already indicated by the user as matching the object of interest, a candidate object and may use a signature of a selected candidate object to identify additional candidate objects.

An embodiment of the invention may present to a user a set of images of candidate objects based on at least one of, for example, a time the images were acquired, a location where the images were acquired and a similarity of the candidate objects to the object of interest. An embodiment of the invention may sort images of the candidate objects according to a similarity of the candidate objects to an object of interest.

An embodiment of the invention may obtain signals from a plurality of devices in a plurality of regions; determine, based on the signals, a set of devices that were present in at least two locations where an object of interest was present and at the same times the object of interest was present at those locations; associate each of the devices in the set with a score based on the number of presences of the device at a locations and at the times where and when the object of interest was present, and associate a device with the object of interest based on the score. An embodiment of the invention may determine a plausible area based on an initial location and a time period; and search for a set of candidate objects from a plurality of candidate objects at the plausible area.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 18 shows an output of a curve generation process according to embodiments of the invention;

FIG. 19 exemplifies computing a weighted covariance according to embodiments of the invention;

FIG. 20 represent weighted covariances of patches according to embodiments of the invention;

FIG. 26 graphically illustrates a process according to embodiments of the invention;

FIG. 27 shows an exemplary screenshot according to embodiments of the invention;

FIG. 28 shows an exemplary screenshot according to embodiments of the invention;

Figure 1:
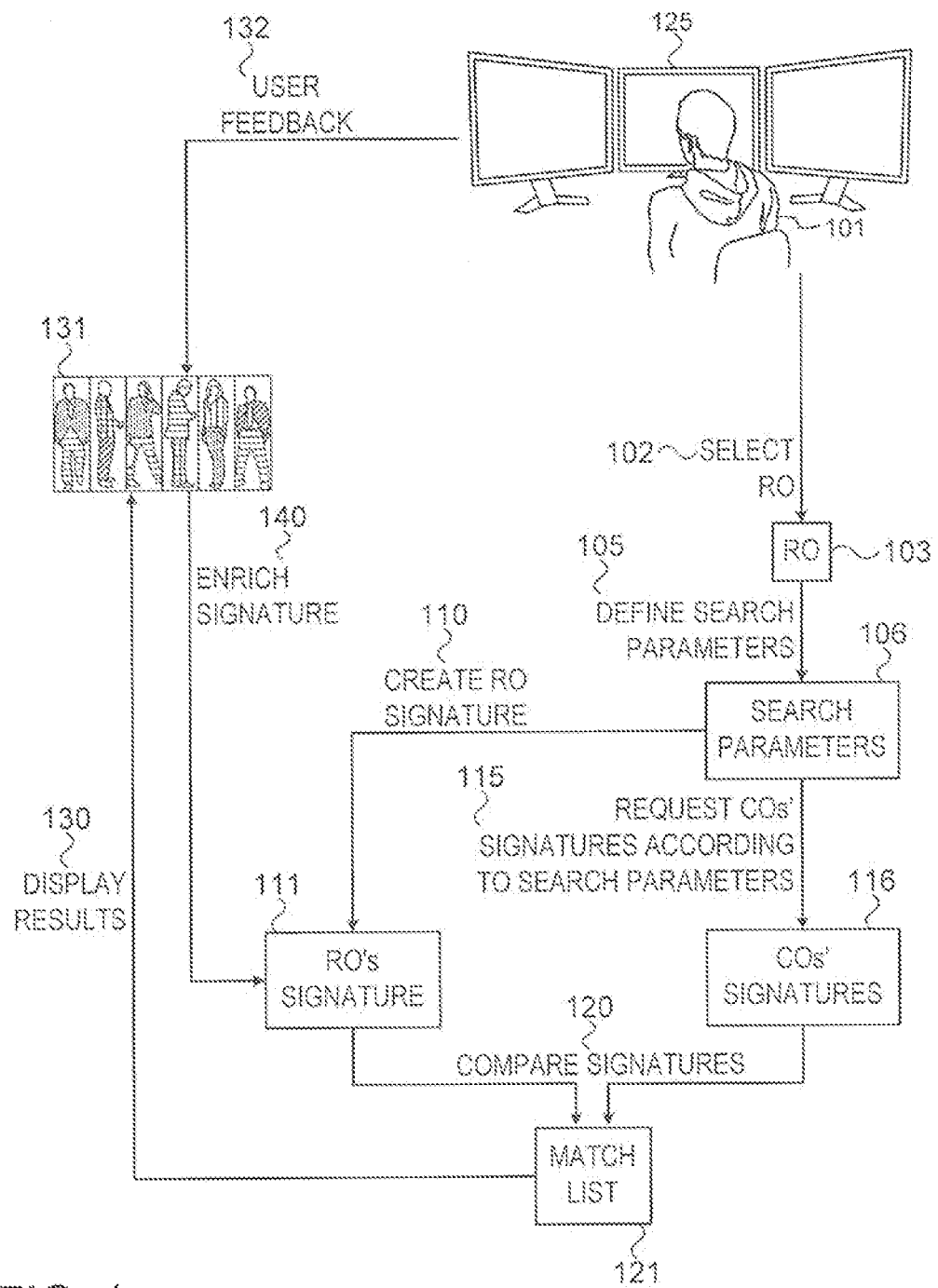
FIG. 1 shows a high-level block diagram of components of a system and flows according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

In many security and enterprise domains there is a growing demand to give the user or operator an automatic tool that can search, identify, detect, monitor and/or track an object of interest within a wide area, covered by cameras, and, possibly, other sensors or systems.

As referred to herein, a reference object (RO) is at least a digital image of any object of interest, e.g., a digital image of a person, a briefcase or a car. An RO may include a portion, section or area of a digital image. For example, one person in an image of three people may be the RO. An RO may further include metadata, e.g., a timestamp indicating the time the image was acquired. Metadata in an RO may include a location, e.g., as reported by a camera that acquired the RO image.

As referred to herein, a candidate object (CO) is a digital image of any object, e.g., a digital image of a person, a briefcase or a car. Typically, embodiments of the invention may try to match ROs to COs, and thus identify one of numerous COs as being an RO. E.g., an embodiment of the invention may try to identify or find an RO among COs, where the identified or found CO is an image different from the RO's image but which is an image of the same person or object.

A CO may further include or have related to it metadata, e.g., a timestamp indicating the time the image was acquired. Metadata in an CO may include a location, e.g., as reported by a camera that acquired the CO image. Generally, an RO may be an image of a suspect being searched for or tracked. For example, a user of a system described herein identifies a person as the suspect being searched for, e.g., the user clicks on an image of the person. The image of the person identified as the suspect may be designated as the RO. Images of people who look similar to the suspect may be designated as COs. For example, based on similar height, or similar color of clothes etc. COs may be selected. As described herein, COs may be used to search for an RO. For example, an image designated as a CO may turn out to be an image of the suspect, that is, the CO may be the RO. For the sake of simplicity, as used herein, an RO or CO can refer to both a) the object itself (e.g., the person or suspect) and b) an image representing one view of the RO or CO. It will be understood that when discussing images presented or selected, and RO or CO refers to the image of the RO or CO and, where applicable, e.g., when discussing the RO moving in a location, an RO refers to the actual object, e.g., the RO may be a person. As described herein, an RO or CO may be a sub-image of a larger image. For example, an image that shows a suspect and other people may be referred to as the RO, or the RO may be a portion of such an image.

For example, an RO may be an image of a person who entered an unauthorized area or left a security check point without permission. An embodiment of the invention may use the RO (e.g., an image of a person) in order to evaluate one or more CO's, e.g., images of other people or other images of the person (or images possibly of the person) in the RO, in order to find the person (RO) in a wide area such as an airport terminal. For example, a plurality of COs that are images of people in a crowd may be evaluated with respect to an RO in order to locate the RO.

Reference is now made to FIG. 1, which shows a high-level block diagram of components of a system and flows according to embodiments of the invention. As shown by arrow 102, a user 101 may select an RO 103 from (or in) images presented by a system. For example, a plurality of images is presented to user 101 (e.g., by being displayed on monitors 125) and the user clicks on an image of a person in the plurality of images thus indicating an RO. As shown by block 103, an RO object may be created or defined. For example, an image of a suspect is designated and saved as an RO. As shown by arrow 105, search parameters may be defined for the RO. For example, as shown by block 106, a set of criteria or features is defined and saved as search parameters for a specific RO.

As shown by arrow 110, a signature 111 for an RO may be defined, generated and/or saved. For example, a signature may be a file or memory entry that stores parameters, values and other data that define or constitute a signature of an RO.

As shown by arrow 115, COs' signatures 116 may be obtained, e.g., from a database. For example, COs 116 may be images of people in an area where the RO is located. As described herein, COs (e.g., images of people) may be selected, e.g., from hundreds or thousands of images based on a similarity of the COs to an RO. For example and as described, a set of COs may include images of people who resemble, in looks, the RO.

As shown by arrow 120, a signature 111 of an RO may be compared or otherwise related to COs' signatures 116 to generate or update a match list 121. As shown by arrow 130, results 131 may be presented to user 101. For example, based on a matching of COs' signatures 116 to an RO signature 111, a set of images may be selected by the system to present to the user. Objects may be presented to a user, for example by being displayed on a monitor such as monitor 125. As shown by arrow 132, user 101 may provide feedback on presented results 131. As shown by arrow 140, RO signature 111 may be enriched or updated based on feedback from user 101.

Figure 2:
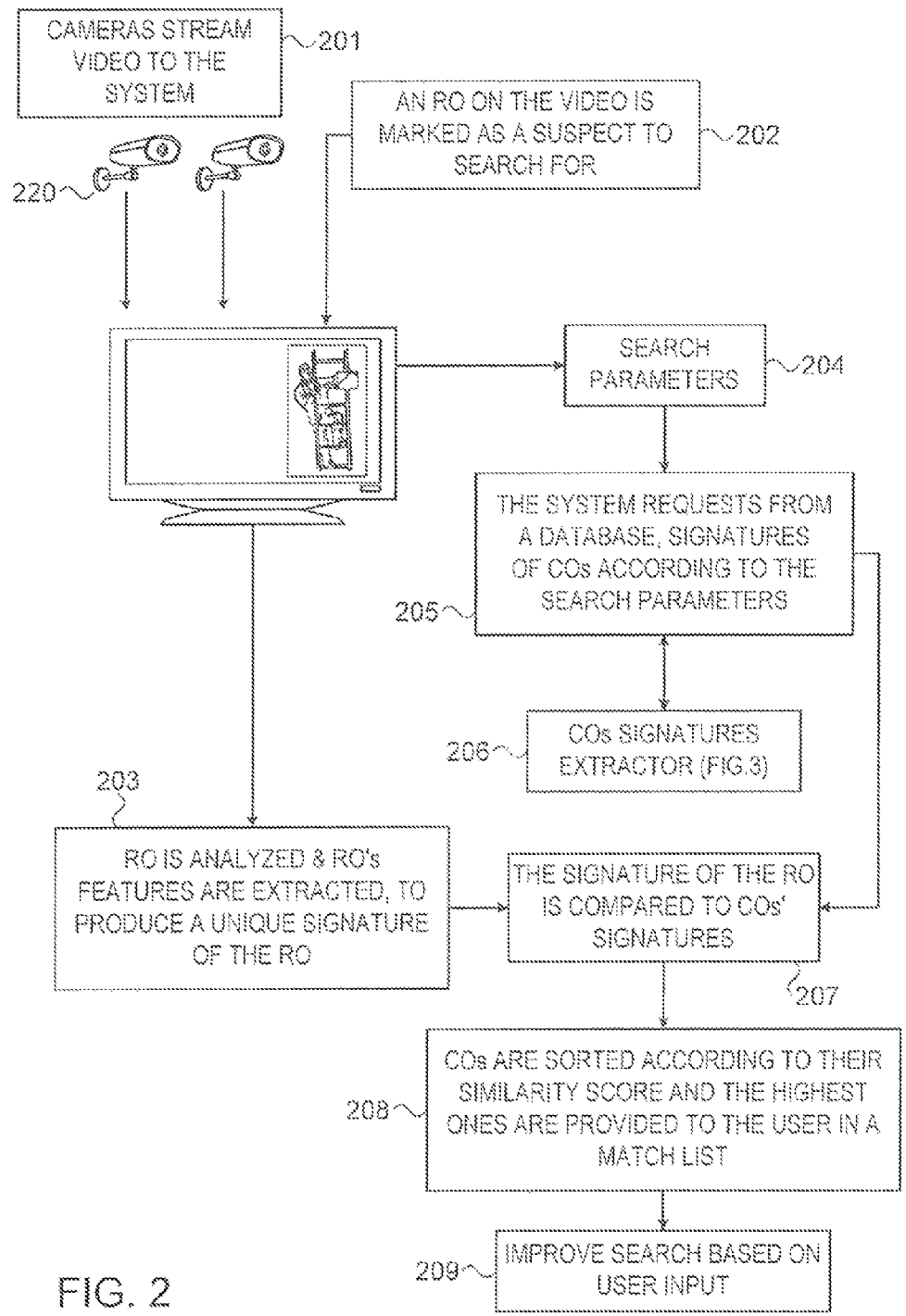
FIG. 2 shows a high-level block diagram of components of a system and flows according to embodiments of the invention.

Reference is now made to FIG. 2, which shows a high-level block diagram of components of a system and flows according to embodiments of the invention. As shown by block 201, cameras 220 may stream video to a system. For example, cameras 220 may continuously stream video or images from a location or area, e.g., an airport terminal. Multiple cameras 220 may receive input from an area, and the FOV from the cameras may overlap or may not. Input from cameras 220 may be recorded and processed. As shown by block 202, an RO in a video stream is marked. For example, in an embodiment, user 101 clicks on an image of a suspect (e.g., uses a pointing device such as a mouse to move an on-screen cursor or other indicator over the image, and clicks on the mouse or otherwise provides input) to indicate this is the RO. In another embodiment, an RO is automatically identified, designated or marked by the system or some other integrated system. For example, a video analytics system may analyze events in a scene and generate an alert according to predefined rules, criteria or scenarios, e.g., a person who moves in an unauthorized direction, enters a restricted area or leaves an unattended bag or exhibits some abnormal behavior. An object indicated in an alert from a video analytics system may be automatically identified, designated or marked as an RO. For example, a video analytics system may provide an input RO as shown by block 202. As referred to herein, an RO or a CO may be an image of an actual object (e.g., an image of a person) or they may be subparts of larger images, e.g., if a suspect is shown in an image that shows other people. Where applicable, an RO or CO may be the actual objects, e.g., an RO can be the suspect himself.

Designating an object as either an RO or a CO may be automatic and/or dynamic. For example and as described herein, if a system or method according to embodiments of the invention determines that a CO matches an RO, then the system or method may automatically designate or mark the matching CO as an RO. Thus suspected COs may when their identity is confirmed be used in future searches as references. Accordingly, any object (or image of an object) may be identified, designated or marked as a CO or RO automatically and/or dynamically. For example, a CO in a first search that was found or determined to match an RO may be designated and used as an RO in a subsequent search.

In an embodiment, a system records metadata related to an RO. For example, coordinates of an RO in a frame or image are recorded, e.g., stored in association with the RO. As shown by block 203, an RO may be analyzed. In an embodiment, RO's features are extracted, e.g., from an image, and used to produce a unique signature of the RO. Accordingly, a signature of an RO is produced.

As shown by block 204, search parameters may be obtained. For example, in an embodiment, an operator of a system provides search parameters, e.g., areas or times in which to search for the RO. According to an embodiment, an operator of a system may provide a list of relevant cameras and a search for an RO may be performed, by a system, based on input from the relevant cameras only, e.g., ignoring irrelevant cameras based on input from a user. For example, if the user only wants a system to search for an RO in a specific hall or terminal then the user may indicate that only input from cameras located in the specific hall or terminal is to be used. Search parameters 204 may include geographic information system (GIS) data. For example, input from cameras may be included in, or excluded from processing based on GIS data indicating cameras' locations. For example, cameras 220 may include their respective locations in input provided as shown by block 201.

In another embodiment, a system may provide the search parameters. For example, a video analytics system may provide search parameters. For example, if an intrusion to a restricted area occurs then, according to an embodiment of the invention, a system that includes video analytics may indicate a camera that captured the intrusion, since the location of the camera may be known, a search parameter related to a location (e.g., in which terminals to search for the RO) may be automatically determined. In another embodiment, if a user defines the time interval for searching for the RO, then a system may automatically calculate the plausible areas and cameras. For example, an embodiment of the invention calculates the plausible areas and the plausible cameras based on the location and time the RO was last seen, based on the RO's typical or maximal velocity and/or based on the location of the cameras.

For example, if an RO's initial location and velocity are known, then for a given time period, e.g., the following 5 minutes, a system according to an embodiment can calculate the expected maximal distance from the initial location the RO can be in. For example, a radius of a circle centered at the initial location is calculated for a specific time and the circle or radius are used to determine plausible areas and/or plausible cameras.

For example, based on an indication from a user, an embodiment of the invention may determine a location, and a time period during which to search for an object of interest. For example, a user may request to search for a suspect in a specific terminal in an airport from 08:00 until 17:00.

Accordingly, based on user input, an embodiment of a system may determine where to begin the search from an initial location of the object of interest. In another embodiment, based on a place and/or time an object of interest was last seen, an embodiment of a system or method may determine the time and location when and where to start searching for the object of interest. Based on an initial location of an object of interest, an embodiment of a system or method may determine a plausible area and time for a search. For example, if the initial location of the object of interest is a specific terminal in a train station then the plausible area may be the terminal and neighboring terminals. A plausible area may be determined based on a movement of the object of interest. For example, a plausible area may be determined based on a direction and speed of movement of the object of interest. For example, the faster the object of interest is moving, the larger the plausible area may be. According to an embodiment, once the plausible area has been determined, candidate objects in the plausible area may be examined. For example, if when searching for a suspect it was determined that the plausible area includes three terminals in an airport then images of people (candidate objects) in those three terminals may be processed to generate signatures as described herein and similarity scores for people in the plausible area may be calculated based on the signatures. Accordingly, an embodiment of a system may search for a suspect or object of interest in plausible areas.

As shown by block 205, an embodiment of a system may obtain signatures of COs' based on search parameters 204. For example, a CO signature extractor unit 206 may extract COs' signatures from a database based on search parameters 204. For example, CO's signatures that match search parameters 204 may be provided by a CO signature extractor unit.

As shown by block 207, a signature of the RO may be related or compared to CO's signatures. For example, a similarity score may be associated with COs based on a match of a signature of the COs with a signature of the RO.

In an embodiment, an Image Pairwise Similarity Scoring Method (IPSSM) is used in order to track, detect, identify or locate an RO. In an embodiment, an IPSSM includes producing a unique signature for a CO and a unique signature for an RO and based on relating the signatures of the CO and the RO, associating a similarity score with the CO. Generally, a similarity score associated with a CO (with respect to a given RO) indicates how similar the CO is to the RO. For example, a high similarity score indicates a CO is similar to an RO and a low similarity score indicates the CO is dissimilar from the RO. A similarity score may be associated with a plurality of CO's (with respect to a given RO) and, based on the similarity scores, a set of COs may be selected from the plurality of COs and the set may further be sorted based on similarity scores of CO's in the set.

In an embodiment, producing a unique signature includes crossing or intersecting an object within an image with a curve or line, placing or defining areas or patches on the curve, manipulating dimensions of patches on the curve and calculating a signature based on the patches. Based on the signatures of a CO and an RO, a pairwise similarity score that represents a similarity level between an RO and a CO signatures is generated, calculated or determined. The IPSSM is further described herein, e.g., with reference to FIG. 11.

As shown by block 208, COs may be sorted according to a similarity score and the COs associated with the highest scores may be provided to the user, e.g., as a sorted match list.

As shown by block 209, a search for a suspect or suspect object may be improved based on input from a user. For example, a user can refine a search for an RO by providing feedback about the correctness of the match (e.g., selecting 1 or 0 to indicate correct/incorrect match) and accordingly, search parameters may be modified.

A new search may be initiated with additional images of the RO. In an embodiment, a learning method or algorithm may be implemented by a computing device and the learning method or algorithm may learn from user feedback to increased search accuracy.

Figure 3:
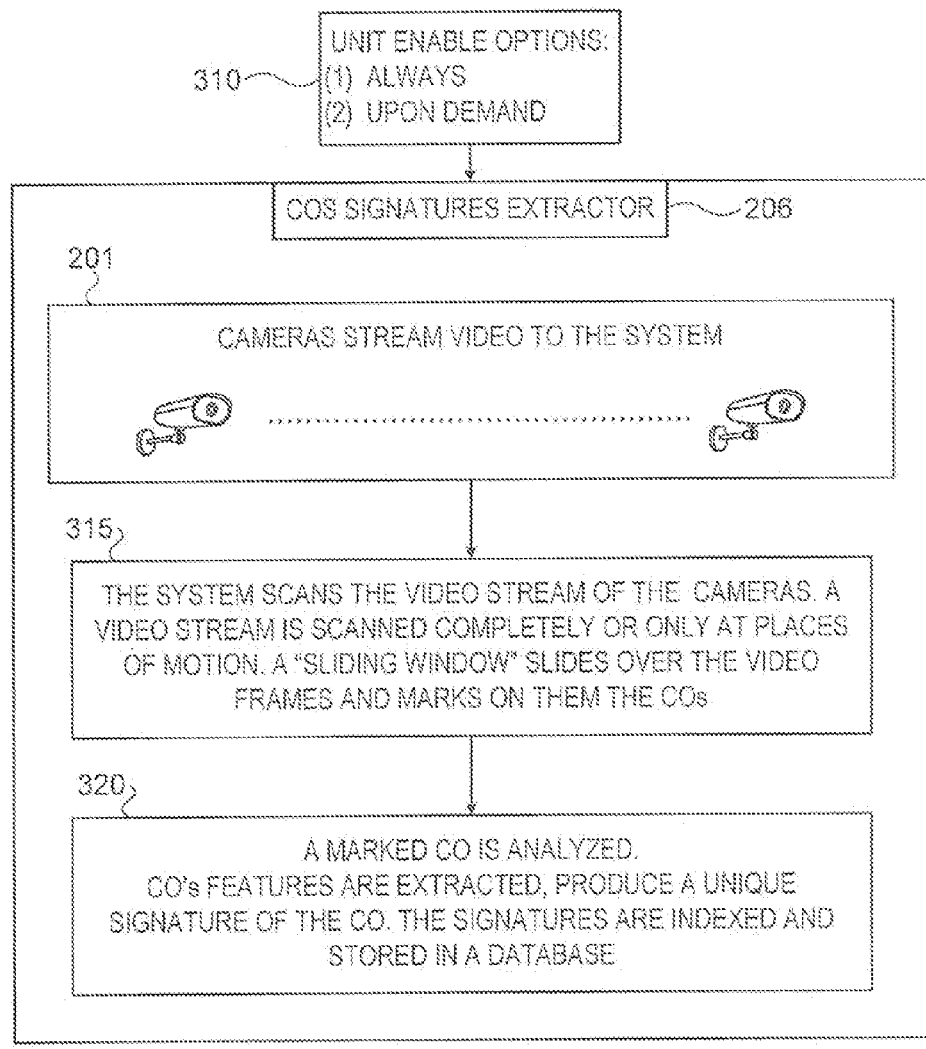
FIG. 3 shows a high-level block diagram of components of a system and a flow according to embodiments of the invention.

Reference is now made to FIG. 3, which shows a high-level block diagram of components of an embodiment of a system and a flow according to embodiments of the invention. As shown by block 310, CO extractor unit 206 may operate in one of a plurality of modes. For example, a first mode may be "ALWAYS" whereby signatures of COs are extracted regardless of whether or not a search for an RO is in progress. In this mode ("ALWAYS"), COs signatures may be generated and ready for use when a search for an RO is initiated. Accordingly, a search for a specific RO may be performed faster. For example, an embodiment of a system may continuously generate signatures for people in a crowd.

However this ("ALWAYS") mode typically requires more computational resources (e.g., central processing unit (CPU) power). Accordingly, CO extractor unit 206 may operate in a second mode, "UPON DEMAND", whereby signatures of COs are generated only when a search is initiated or is in progress. This ("UPON DEMAND") mode typically requires less resources (e.g., less CPU power) and may be more suitable if computation resources are limited.

As shown by block 201, video streams may be provided. As shown by block 315, video streams may be scanned. An entire video stream may be scanned or only portions of the stream may be scanned. For example, only portions of a video stream in which motion is detected may be scanned. A "sliding window" may be used as known in the art. For example, a "sliding window" may be made to slide over video frames and COs in the sliding window may be identified and/or marked.

As shown by block 320, a marked CO may be analyzed. For example, CO's features are extracted or determined, and the features may be processed to produce a unique signature of the CO. Signatures of COs may be indexed and stored in a database.

As referred to herein, attributes or features of an RO or a CO may be any attribute, parameter of feature. For example, attributes or features of an RO or a CO may be any feature in a face of a person, a color of hair, a skin complexion and the like. Features of an RO or CO may be a height, estimated weight or other physical attributes.

Features of an RO or CO may be related to devices operated by an RO or CO. For example, any attribute, value or parameter of an electronic device operated by an RO or CO, e.g., amount or type of data sent and received by a wireless device operated by an RO or CO may be recorded as a feature of the RO or CO. For example, an RO may be a person who uses a Bluetooth protocol device, a WiFi device and/or a wireless device. In an embodiment, any information related to devices used by an RO may be recorded and information related to devices used by a CO may be related (e.g., compared) to information related to devices used by the RO in order to determine whether or not the CO is the RO. For example, attributes or characteristics of a device operated by an RO or CO may be included in a signature of the RO or CO. Accordingly, when computing a similarity score that may indicate whether or not a CO is similar to an RO, the similarity score may be based on attributes or characteristics of devices used or operated by the CO and RO. For example, a serial number of a mobile device, a type of the device (e.g., whether it is a tablet computer, a mobile phone or a laptop computer) or any other characteristic may be included in a signature generated for an RO or for a CO. Accordingly, if a first device is associated with an RO and a second device is associated with a CO then a similarity score generated as described may be higher if the two devices are similar (or same). Similarly, if the two devices are different in nature (e.g., the device used by the RO is a smartphone and the device used by a CO is a laptop computer) then the a similarity score generated as described may be lower.

Features, parameters or values related to a CO may be examined and related to those of an RO in order to determine whether or not a CO is the RO. In an embodiment, in order to track, monitor or identify an RO, one or more COs are evaluated. For example, in order to find, identify or track a specific person in a crowd (an RO) a plurality of people in the crowd (COs) are examined by an embodiment of a system.

Figure 4:
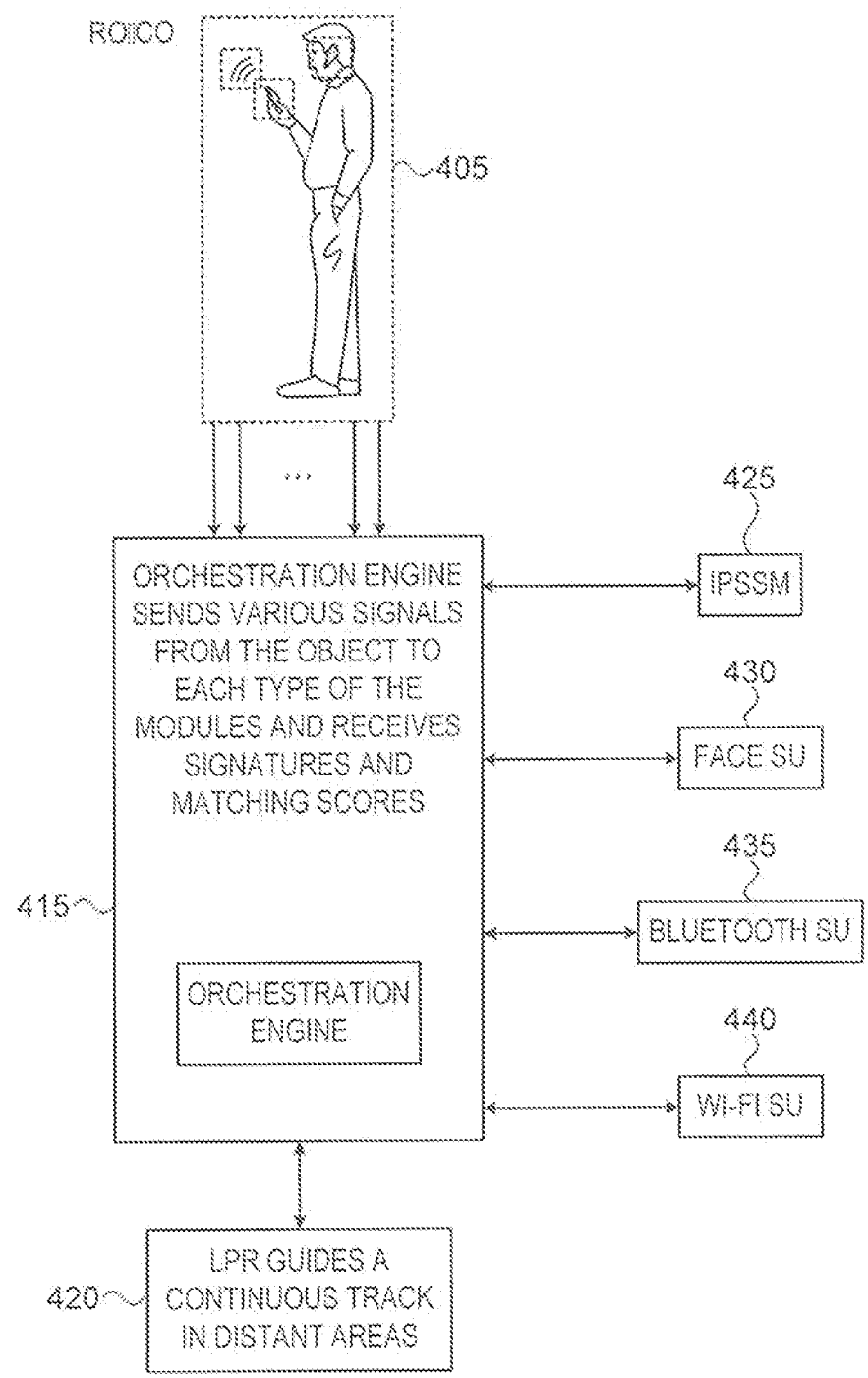
FIG. 4 shows a high-level block diagram of components of a system and flows according to embodiments of the invention.

Reference is now made to FIG. 4 which shows a high-level block diagram of components of an embodiment of a system and flows according to embodiments of the invention. As shown by blocks 405, an RO or CO (that may be a person) may be associated with a plurality of devices. Any data related to devices operated by an RO or CO may be regarded as a feature of the RO or the CO.

A system and method according to embodiments of the invention may calculate or generate a signature for an RO and/or a CO. A signature may be or may include one or more parameters and/or values. For example, a signature may include features such as color of eyes, complexion of skin, height and the like. A signature of an RO or CO may include attributes, values or other data related to devices operated the RO or CO. For example, a signature may include an average rate of data transmitted by a communication device (e.g., a smartphone or Bluetooth device). A signature may include an identification of the type of data transmitted or received by an electronic device operated by an RO or CO, e.g., voice and/or data.

As shown by block 415, an orchestration engine 415 may receive signals related to an RO or CO and provide the signals to an appropriate module or unit that may generate a signature based on the signals. For example, orchestration engine 415 may receive signals related to a Bluetooth protocol device, a WiFi device or other wireless device operated by an RO or a CO.

Orchestration engine 415 may receive data or signals related to a CO or RO, select a unit for processing the data or signals, and provide the data to a selected unit. For example, a unit may be a processor executing a software unit or module. For example and as described herein, units, modules or engines discussed herein may be a controller (e.g., controller 3105 discussed below) and a segment of executable software. For example, a controller and executable code may be a unit or module configured (e.g., by being connected to a memory storing instructions or software) to process data or signals, and generate a signature based on the signals. As shown by units 425, 430, 435 and 440, a plurality of modules or units may each receive, from orchestration engine 415, signals or data related to a CO or RO and generate a signature based on the signals. For example, IPSSM unit 425 may be a unit that performs the IPSSM described herein. For example, IPSSM unit 425 may receive an image of a CO or an image of an RO and generate a signature based on the image, IPSSM unit 425 may compare or otherwise relate a signature of a CO to a signature of an RO to calculate a similarity score. For example, in an embodiment, a high similarity score may be associated with a CO if, based on relating its signature to a signature of an RO, it is determined that the CO is similar to the RO. Similarly, in the embodiment, a low similarity score is associated with the CO if, based on relating its signature to a signature of the RO, it is determined that the CO and the RO are dissimilar.

Face signature unit (SU) 430 may receive an image of a face and generate a signature for the face. A Bluetooth SU 435 may receive data related to a Bluetooth device and generate a signature for the Bluetooth device, and a WiFi SU may receive data related to a WiFi device and generate a signature for the WiFi device. Accordingly, units 425, 430, 435 and 440 may generate signatures for an RO and/or a plurality of COs and provide the signatures to orchestration engine 415.

Units 425, 430, 435 and 440 may generate a similarity score based on signatures. For example, face SU 430 may receive signatures generated based on images of an RO and a CO and calculate a similarity score for the RO/CO pair based on the signatures. Face SU may receive signatures generated based on faces of a CO and an RO and calculate a match or similarity score for the RO/CO pair based on the signatures. Bluetooth SU 435 may receive, from orchestration engine 415, signatures related to Bluetooth devices operated by a CO and an RO and calculate a similarity score based on the signatures. WiFi SU 440 may receive, from orchestration engine 415, signatures related to WiFi devices operated by a CO and an RO and calculate a similarity score based on the signatures.

Orchestration engine 415 may merge similarity scores received from units 425, 430, 435 and 440 and generate a similarity score that may indicate a similarity of a specific CO to a specific RO. Accordingly, an embodiment of a system and method may indicate to a user whether or not a CO is indeed the RO or is similar to or likely to be the RO based on a plurality of attributes and features. An embodiment of a system and method may indicate to a user the level of similarity between a CO and an RO based on a plurality of attributes and features.

As shown by block 420, a license plate recognition (LPR) unit may be included in an embodiment of a system. For example, in case an RO leaves the scene by a vehicle, LPR unit 420 may be used to point on a new location where the vehicle is be spotted and guide a suspect search system to continue a search of the RO at additional locations.

Figure 5:
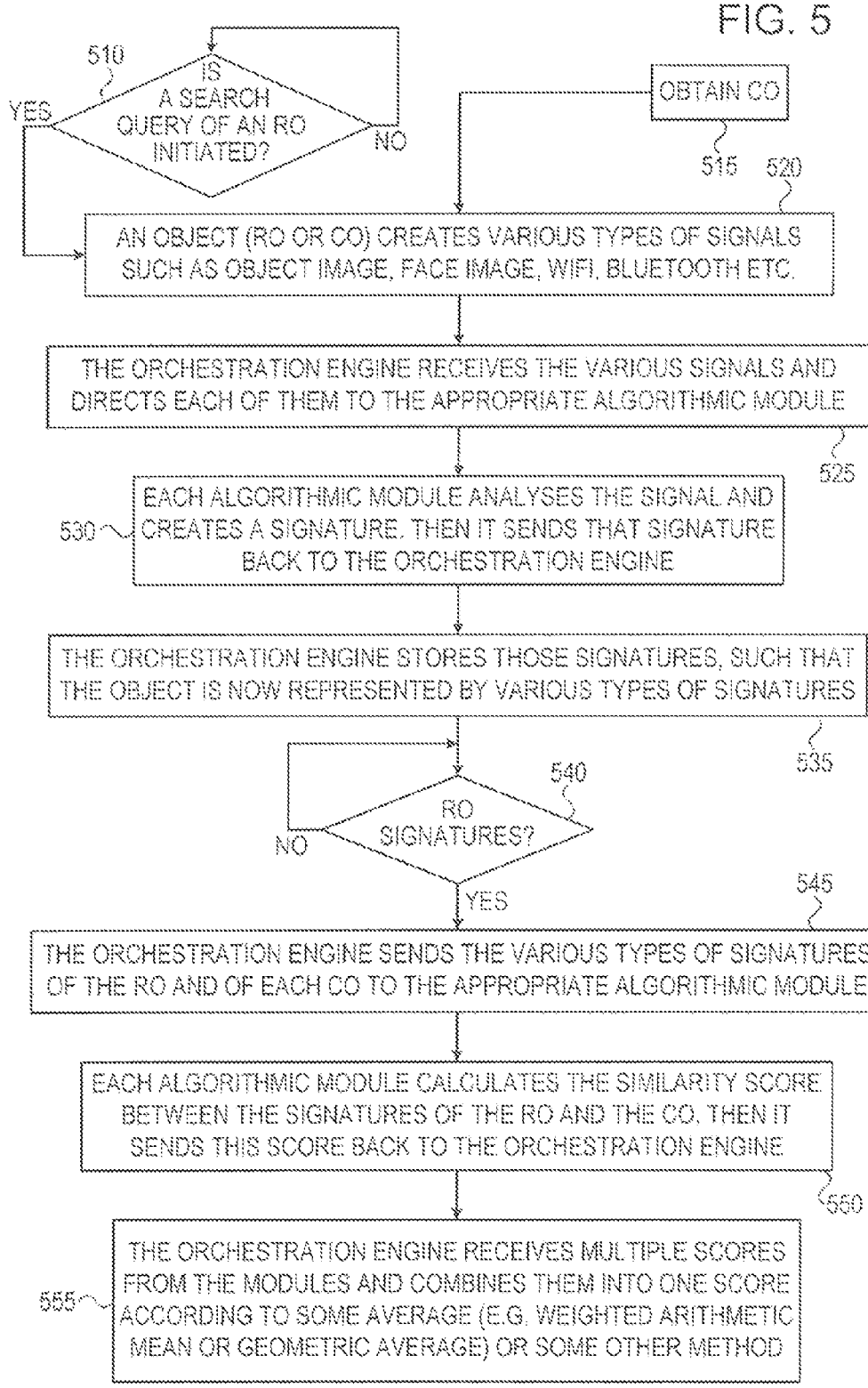
FIG. 5 shows a high-level block diagram of a flow according to embodiments of the invention.

Reference is now made to FIG. 5 which shows a high-level block diagram a flow according to embodiments of the invention. As shown by block 510, if no search is initiated for an RO then an embodiment of a system may wait until a search is required. As described herein, e.g., in order to save resources, an embodiment of a system may not process COs if a search for an RO is not requested or in progress. As shown by block 515, a CO may be input or obtained. For example, if images of people in a train station are continuously captured and stored in a database then the images (now used as COs) may be obtained or retrieved from the database. For example, if or when a search for an RO) (e.g., a specific person) in a crowd is initiated then images of people in the crowd may be obtained and used as COs. For example, an image and other data related to an object or person may be obtained and used as a CO. For example, if an image of a suspect is identified it may be designated as the RO and additional images of people (e.g., in places where the suspect might have been) may be used as COs. The COs are candidates for being identified as the RO, e.g., the COs are possibly the RO.

As described herein, when searching, tracking or monitoring an RO, an embodiment of a system may process a plurality of COs, accordingly, the flow shown in FIG. 5 may be repeated for a plurality of COs. For example, in searching for a person in a crowd, images of (and other data related to) people in the crowd may be obtained and used as a CO as shown in FIG. 5.

As shown by block 520, an object (RO or CO) may create, or be associated with, various types of signals or data, e.g., object's image, face image, WiFi related data, Bluetooth related data etc. As shown by block 525, orchestration engine 415 may receive the various signals and may direct signals and data to the appropriate unit or module, e.g., one of units 425, 430, 435 and 440.

As shown by block 530, each module or unit in units 425, 430, 435 and 440 may analyze received signals and may create a signature. Each unit in units 425, 430, 435 and 440 may send the signature it created back to orchestration engine 415.

As shown by block 535, orchestration engine 415 may store received signatures. Accordingly, a CO may be represented by a plurality of signatures related to a respective plurality of attributes. For example, a CO may be associated with a first signature related to a face and a second signature related to a WiFi device.

As shown by block 540, orchestration engine 415 may determine whether or not signatures of an RO are available. For example, if a search for a suspect (the RO) has begun but signatures of the RO have not yet been produced then orchestration engine 415 may wait until such signatures are available.

As shown by block 545, orchestration engine 415 may send signatures of the RO and a CO to an appropriate unit. For example, if a signature received as shown in block 530 is related to a WiFi device then orchestration engine 415 may send the signature to the WiFi SU 440.

Orchestration engine 415 may send signatures of an RO and of a CO to one of the units shown by units 425, 430, 435 and 440 and the unit may calculate a similarity score based on the signatures. For example, WiFi SU 440 may calculate a WiFi signature for an RO, calculate a WiFi signature for a CO and provide the signatures to orchestration engine 415. Orchestration engine 415 may send the WiFi signatures of the RO and CO to WiFi SU 440 and WiFi SU 440 may calculate a similarity score based on the two signatures. Accordingly and as shown by block 550, in an embodiment, each unit in units 425, 430, 435 and 440 may calculate the similarity score between the signatures of the RO and the CO and send the score to the orchestration engine 415.

As shown by block 555, orchestration engine 415 may receive multiple scores from units 425, 430, 435 and 440 and may combine received scores into one score. For example, orchestration engine 415 generates a score for a CO according to an average (e.g., weighted arithmetic mean or geometric average). It will be understood that any other method of generating a score based on a number of scores may be used.

Figure 6:
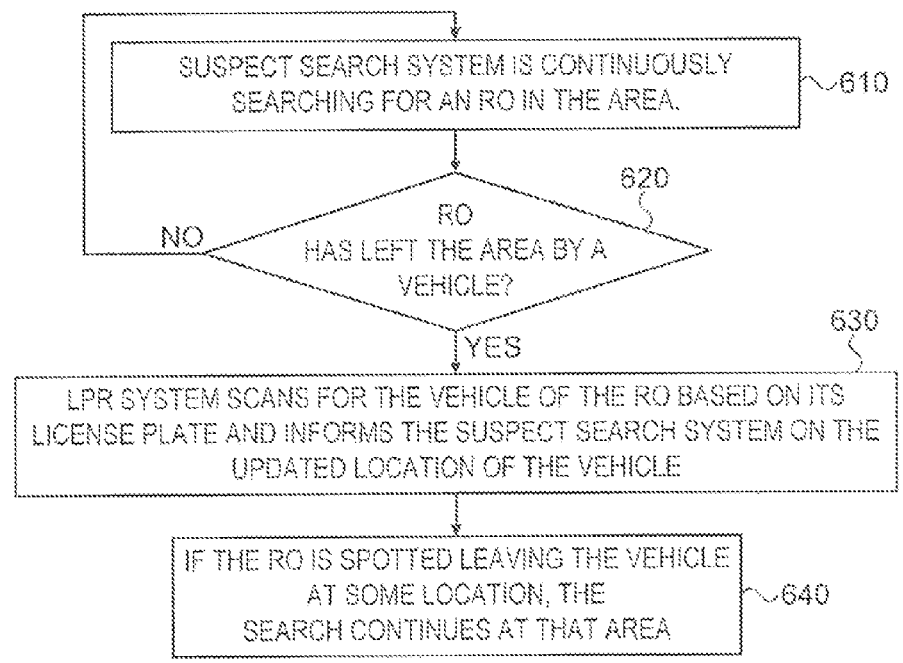
FIG. 6 shows a high-level block diagram of a flow according to embodiments of the invention.

Reference is made to FIG. 6 which shows a high-level block diagram a flow according to embodiments of the invention. As described, an LPR unit may be included in an embodiment of a system. As shown by block 610, an embodiment of a system may search, find and/or track an RO by matching COs to the RO. As shown by block 620, an embodiment of a system may be notified that an RO has left the area where the search is done. As shown by block 630, an LPR unit or system may be activated and may search for the RO by searching for a vehicle used by the RO. Accordingly, if an RO leaves a first location and drives to a second location an embodiment of a system may track the RO to the second location. As shown by block 640, the search for the RO may continue in the second location.

Figure 7:
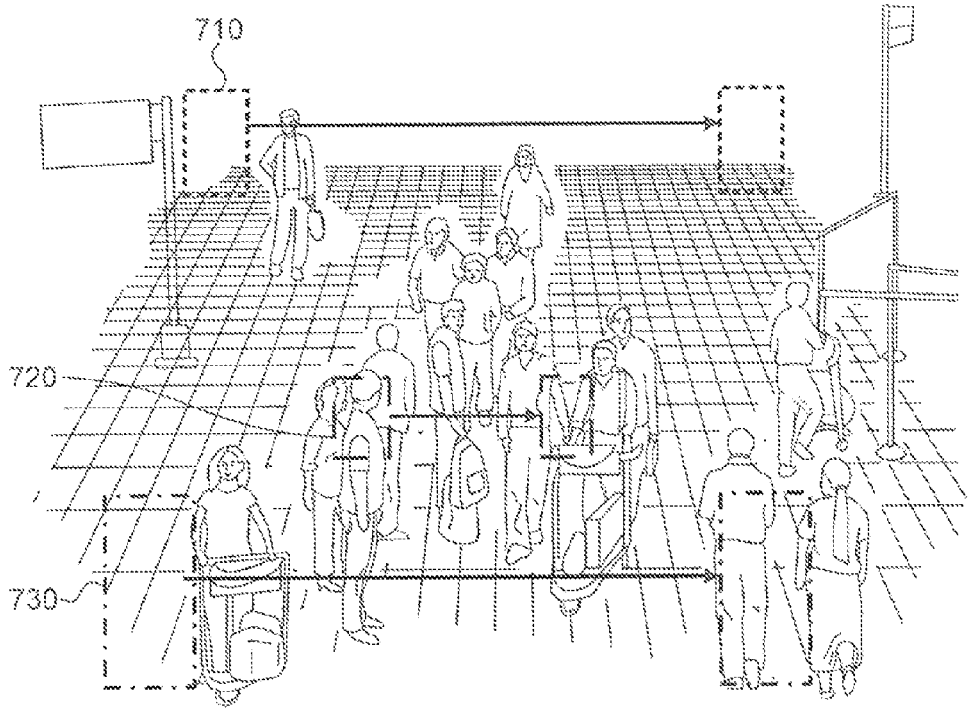
FIG. 7 exemplifies a scan of a sliding window over a frame according to embodiments of the invention.

An embodiment of a system may search for an RO based on a specification (e.g., an image or other attributes of a suspect) or based on an indication received from a user. In an embodiment, a system displays images of a scene to a user and the user may mark the RO. For example, a marking may be a rectangle surrounding the RO or any other bounding box or shape, e.g., an ellipse. Images used may be a gray-level or color images. A mark or bounding box may also contain pixels of the background of the RO or of some other irrelevant objects. Search parameters as referred to herein may include any relevant parameters, e.g., an area or areas in which to search for the RO, a selection of cameras, a selection of locations, a time or a set of frames in a video stream. Search parameters may be provided by a users or automatically calculated by an embodiment of a system as described herein Embodiments of the invention may use a sliding window. For example, COs examined may be images of the objects in the video frames. One possible way to extract images of COs from a video stream is using a sliding window, where a window slides along the frame with changing sizes of the window and COs are extracted in each location. Reference is made to FIG. 7 that exemplifies a scan of a sliding window over a frame, where, in each scan, a CO is created. The figure also shows several sizes of the sliding window. For example, as shown by 710, 720 and 730, windows of different sizes are moved along the horizontal axis and COs are extracted based on the content of the windows.

However, the above (and as shown in FIG. 7) type of scan is very computational expensive and impractical. Embodiments of the invention may use other methods. According to embodiments of the invention, motion detection may be used to identify moving objects in a video stream. Any motion detection method may be used as known in the art in order to identify moving objects (and stationary objects) in frames or video streams provided by cameras 220.

Figure 8:
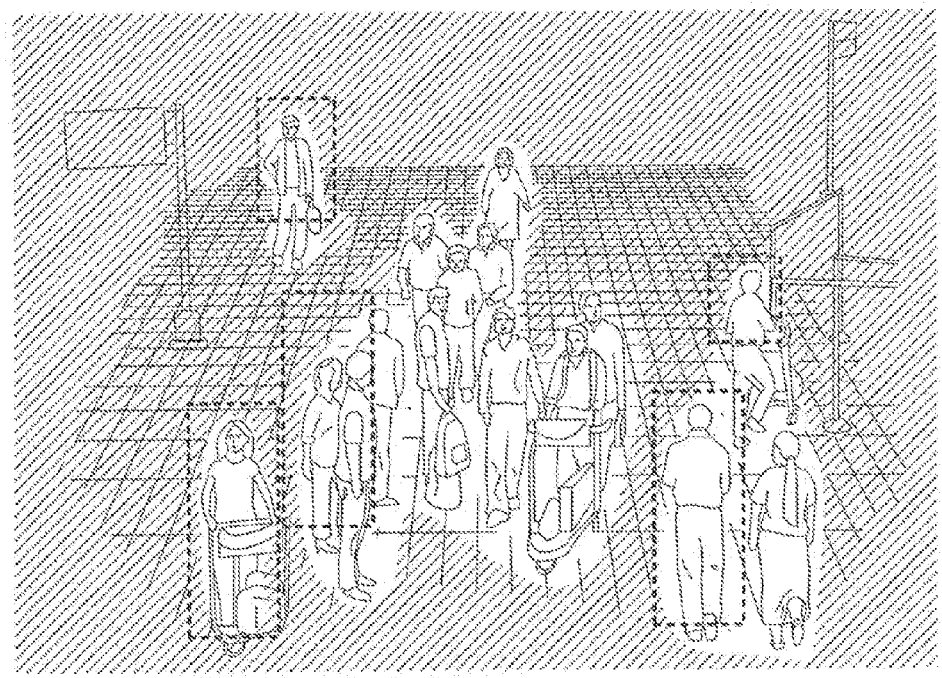
FIG. 8 exemplifies operation of a sliding window according to embodiments of the invention.

Reference is made to FIG. 8 that exemplifies a sliding window that only scans locations of motion in a video, thus possibly ignoring areas in a frame that contain irrelevant COs. For example, if an RO is person, it may be assumed the RO will be moving and, accordingly, areas in a frame where no motion is detected may be ignored. Accordingly, in an embodiment, a window may be made to scan only areas where motion is detected. In case a user of an embodiment of a system wants to search for objects regardless to their motion, the entire frame may be scanned by a sliding window.

Figure 9:
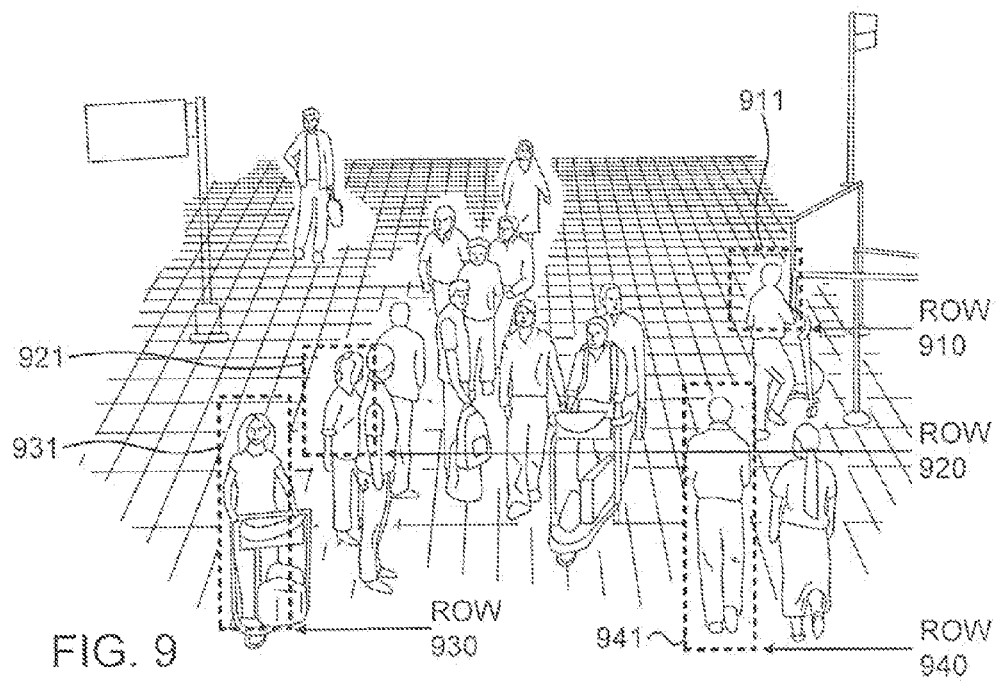
FIG. 9 shows a windowing method according to embodiments of the invention.

According to embodiments of the invention, a size of a window may be defined such that, for each of a number of vertical rows in an image, the window will include a human. Reference is made to FIG. 9 that shows a windowing method according to embodiments of the invention. For example, as shown, a window 911 is set for row 910, a larger window 921 is set for row 920, yet a larger window 931 is set for row 930 and yet a larger window 941 is set for row 940. Accordingly, a plurality of sliding windows having a respective plurality of sizes may be defined for a plurality of vertical segments of a frame. For example and as shown in FIG. 9, for each row in the image there may be a fixed typical size of the sliding window. This way, when scanning the image, at each row, the sliding window may be set to one specific fixed typical size (the size of the estimated typical human at that row). The method described may avoid the exhaustive time consuming process of trying numerous window sizes.

Figure 10:
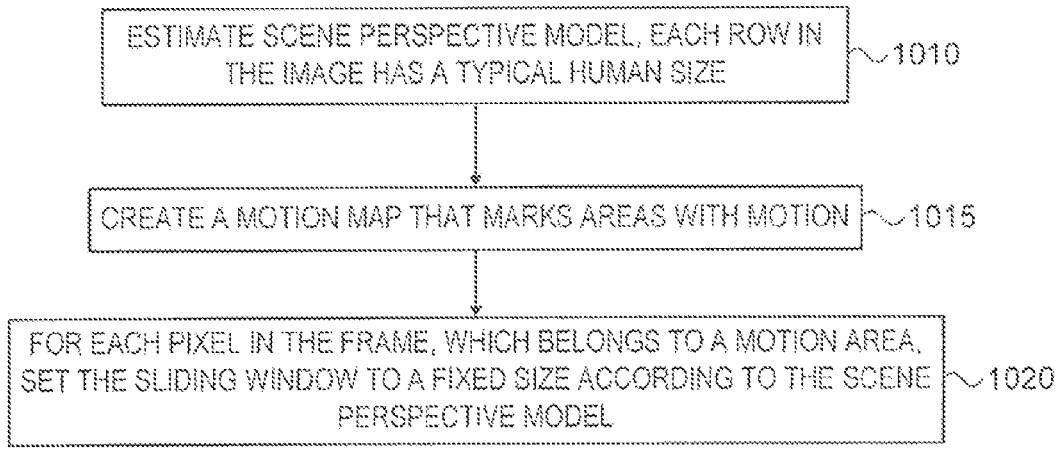
FIG. 10 shows a flow according to embodiments of the invention.

Reference is made to FIG. 10 that shows a flow according to embodiments of the invention. The flow shown in FIG. 10 may be used in conjunction with FIG. 9. As shown by block 1010, an embodiment of the invention may include determining or generating a scene perspective model. In an embodiment, a scene perspective model is generated or determined by identifying people in an image and determining a size (e.g., an average size) of a person or human in an area or portion of the image. Accordingly, the dimensions of a window, box or rectangle that include a person in a horizontal section of an image may be determined. Using a known or fixed rectangle to identify humans in an image may greatly speed the process of identifying humans therein. A set of typical sizes of humans in the image may be calculated for all portions of the image, e.g., using known distances from the relevant camera and the size of a human at a given distance, all other sizes may be calculated. Having calculated these typical human sizes at some specific rows in the image, the perspective model can now complete the typical human sizes for all the rows in the image, which correspond to the fixed typical sizes described herein. As shown by block 1015, an embodiment of the invention may include determining areas in the image where motion is identified. For example, motion detection methods known in the art may be used to identify motion based on a set of images in a video stream. As shown by block 1020, an embodiment of the invention may include setting a size of a sliding window for areas in a frame where motion is detected. For example, as shown by FIG. 9, sliding window 941 is larger than sliding window 911 since the size of a person in the lower portion of the frame is larger than the size of a person in the upper portion. Accordingly, an embodiment of the invention may define and use a plurality of sliding windows having a respective plurality of sizes for the same frame.

Figure 11:
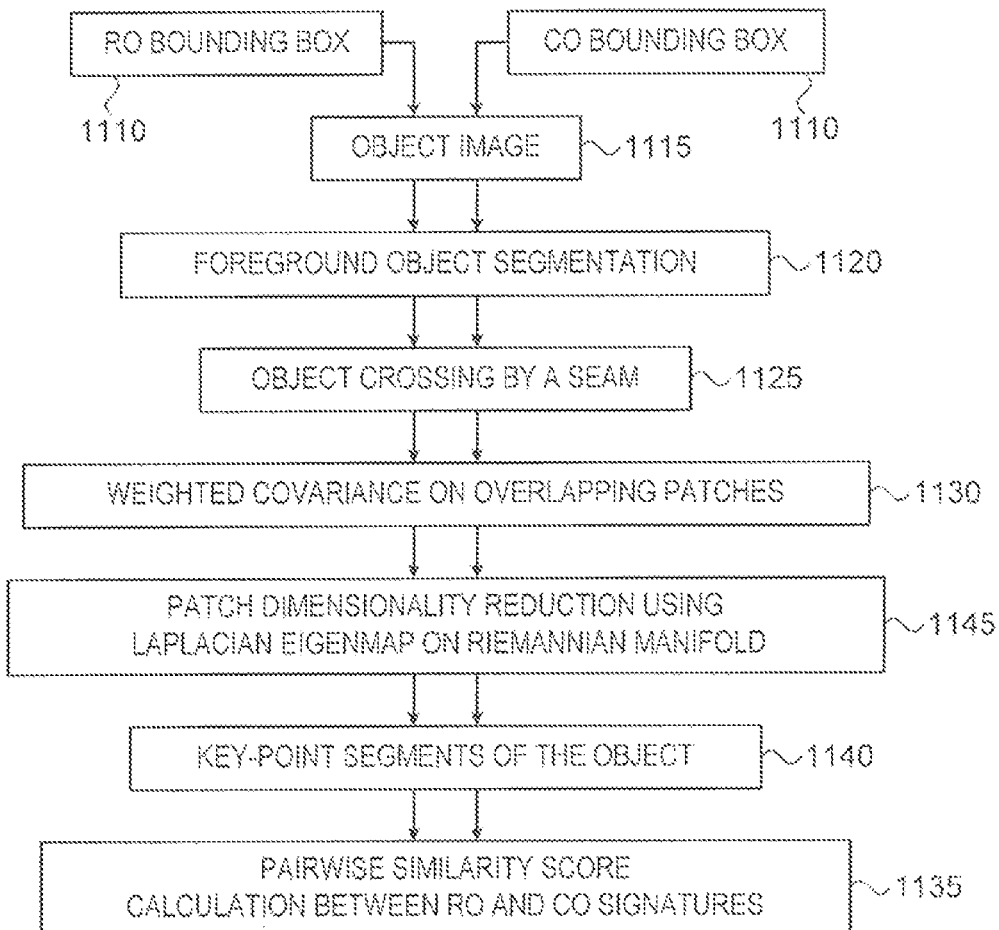
FIG. 11 shows a flow according to embodiments of the invention.

Reference is made to FIG. 11 that shows a flow according to embodiments of the invention. The flow shown in FIG. 11 and described herein generally includes receiving a bounding box that includes an RO or CO, extracting parameters related to the RO or CO, determining or extracting features of the RO or CO, and producing a signature of the RO or CO.

The flow according to an embodiment further includes associating COs with a similarity score based on relating signatures of the COs to a signature of the RO. Accordingly, a flow according to an embodiment may include signature extraction or generation and association of COs with a similarity score.

According to embodiments of the invention, an IPSSM performed by a system or method may include calculating two signatures for each of two objects and then calculating a similarity score between the two signatures. The similarity score may be associated with the relevant CO.

The process may be repeated for a plurality of COs with respect to a single RO such that each of the COs is associated with its similarity score. The CO associated with the highest similarity score may be selected, e.g., as possibly representing (or including) the same object represented or included in the RO. A sorted list of COs may be generated based on similarity scores of the COs. FIGS. 12-22 and related text below further describe embodiments of the IPSSM as well as other elements in an embodiment of a system and method usable for suspect searching, tracking objects or people, identifying objects or people and the like.

Figure 12:
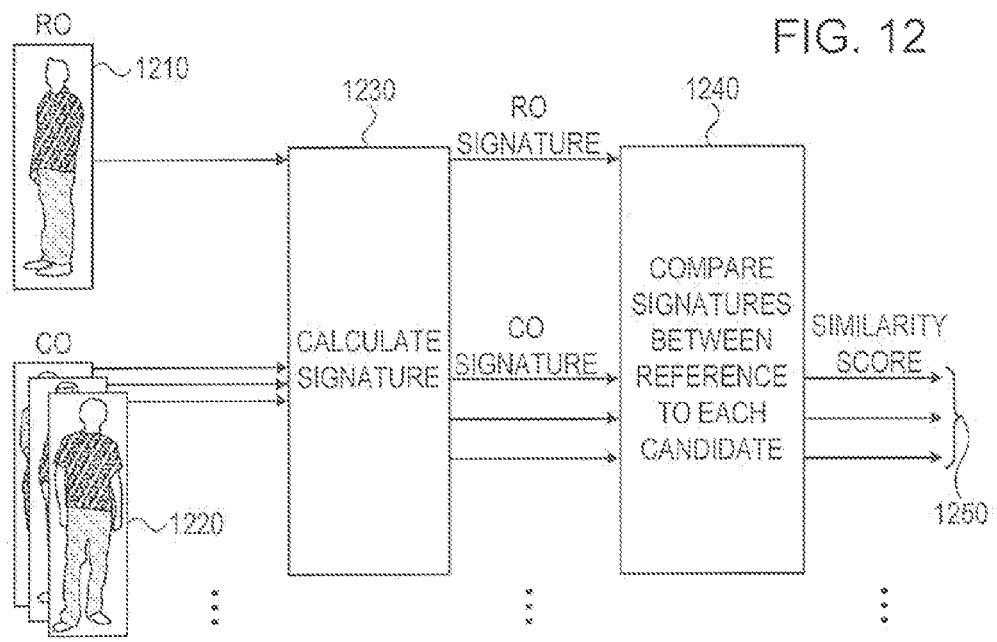
FIG. 12 shows a flow according to embodiments of the invention.

Reference is additionally made to FIG. 12 that illustrates a flow according to embodiments of the invention. As shown by block 1210, a flow according to an embodiment may include receiving an image of an RO. As shown by block 1220, a flow according to an embodiment may include receiving images of COs. As shown by block 1230, a signature generation unit may receive images of an RO and COs and generate signatures for the received images. As shown by block 1240, a scoring unit may receive signatures of an RO and a plurality of COs and generate a plurality of similarity scores. For example, for each CO received as shown by block 1220 a similarity score may be generated wherein the similarity score is indicative of the level of similarity between the RO and the CO. As described herein, a flow according to an embodiment may include selecting and/or presenting to a user the COs associated with the highest similarity scores. Accordingly, an embodiment of a system and method may present to a user a plurality of images that best match an image of an RO.

Figure 13:
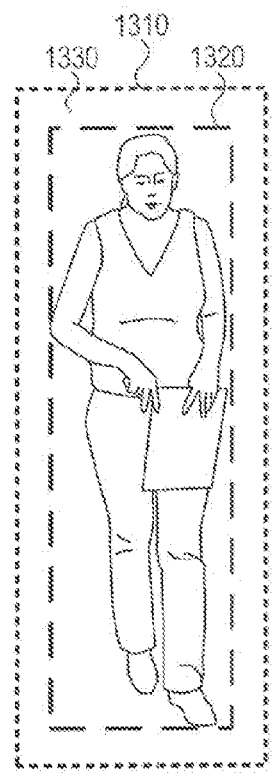
FIG. 13 shows an exemplary object of interest and an exemplary candidate object according to embodiments of the invention.

Reference is additionally made to FIG. 13 which shows an example of an RO or CO that may be used by a system and method according to embodiments of the invention. For example, an object image as shown by block 1115 in FIG. 11 may be as shown in FIG. 13. As shown, rectangle 1320 encompasses foreground object pixels and some of the background pixels (e.g., ground, floor, vegetation and/or other people in an image). In an embodiment, rectangle 1320 is marked by a user. For example, an embodiment of a system may present an image and receive a selection of rectangle 1320 from a user. In another embodiment, rectangle 1320 is determined automatically by a system, e.g., using any object recognition method known in the art and surrounding an identified object by a rectangle as shown by rectangle 1320. For example, rectangle 1320 may be determined by background subtraction (e.g., as disclosed by Piccardi, M., (2004). "Background subtraction techniques: a review". IEEE International Conference on Systems, Man and Cybernetics 4. pp. 3099-3104). As shown, the margin between rectangle 1310 and rectangle 1320 encompasses only background pixels.

As shown by blocks 1110, in an embodiment, a bounding box of an RO or CO is obtained. For example, a bounding box may be a rectangle in an image that includes an image of an RO or a CO, e.g., as shown by window 931. As shown by block 1120, in an embodiment, a method includes foreground object segmentation. Referring back to FIG. 13, object segmentation may be done by discriminating foreground pixels from background pixels. A embodiment of the invention may assume that the object of interest is included entirely within rectangle 1320 box. It may also be assumed that rectangle 1320 also includes background pixels. Despite possibly having some background pixels in rectangle 1320, an embodiment of the invention may initially label all pixels in rectangle 1320 as foreground, e.g., setting their value to one ("1").

An embodiment of the invention may additionally assume that the margin between rectangle 1320 and rectangle 1310 only includes background pixels. Accordingly, in an embodiment, pixels in area 1330 (the area between rectangles 1320 and 1310) are labeled as background pixels, e.g., by setting their value to zero ("0"). In an embodiment, each pixel is characterized by 5 features, its red, green and blue (RGB) value and its relative two dimension coordinates in the image (also referred to herein as patch-image XY). Accordingly, in an embodiment, the 5 features of RGB and coordinates are represented by an {R,G,B,X,Y} combination.

A method according to an embodiment includes normalizing a feature, e.g., setting its value to one of "−1" or "+1". A method according to an embodiment uses a Linear Discriminant Analysis (LDA) (e.g., Fisher's Linear Discriminant as disclosed in Fisher, R. A. (1936). "The Use of Multiple Measurements in Taxonomic Problems". Annals of Eugenics 7 (2), pp. 179-188) to convert the five dimension (5D) feature space, $x_{SD}$, of the pixels into a one dimension (1D) feature space, $x_{1D}$, using the formula below:

$$w = \frac{\mu_{y=1} - \mu_{y=0}}{\Sigma_{y=1} + \Sigma_{y=0}},$$

$$x_{1D} = W \cdot x_{SD},$$

$$x_{1D} = \frac{x_{1D}}{\|x_{1D}\|_2},$$

Accordingly, in an embodiment, the pixels are represented on a 1D space. A method according to an embodiment normalizes the values of pixels in the 1D space such that they are associated with one of two values, e.g., one and zero ("1" and "0"). For example, in an embodiment, a value of zero ('0') represents background pixel and a value of ('1') represents a foreground pixel. A method according to an embodiment normalizes the values of pixels in the 1D space using a using Likelihood Ratio Test (LRT) as shown below:

$$LRT = \frac{f(x_{1D}; \mu_{1D,y=1}, \sigma^2_{1D,y=1})}{f(x_{1D}; \mu_{1D,y=1}, \sigma^2_{1D,y=1}) + f(x_{1D}; \mu_{1D,y=0}, \sigma^2_{1D,y=0})}$$

Figure 14:
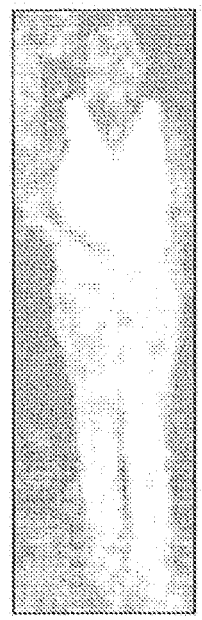
FIG. 14 shows an exemplary output of a foreground object segmentation method according to embodiments of the invention.

Reference is additionally made to FIG. 14 that shows an exemplary output of a foreground object segmentation method according to embodiments of the invention.

Figure 15:
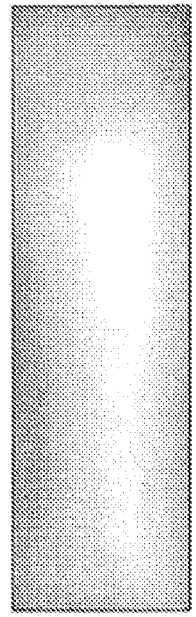
FIG. 15 shows an output of a smoothing of an image according to embodiments of the invention.

As shown by FIG. 14, a resulting image may include noise (or noisy pixels as known in the art). For example and as shown in FIG. 14, some isolated pixel regions are biased towards their false label. A method according to an embodiment smoothes an image (e.g., smooth the image shown in FIG. 14) using a two dimension (2D) average filter with a window size, that is linearly and monotonically dependant in the size of the object. Reference is made to FIG. 15 that shows an output of a smoothing of the image, noted by $LRT_f$, shown in FIG. 14. For example, the image shown by FIG. 14 is an example of an image in which pixels were normalized to LRT as described and the image shown in FIG. 15 is an example of the output of the image in FIG. 14 after smoothing it, e.g., as described above.

As shown by block 1115, a method according to an embodiment determines a curve (also referred to herein as a seam, centerline or simply a line) that crosses a foreground object along its highest cumulative foreground values. In an embodiment, the foreground values are obtained from a filtered image, LRT, as described herein, where each pixel (or value of each pixel) is in the range of [0,1] and where '0' represents the background and '1' represents the foreground as described, in an embodiment, the seam or curve computed is along a symmetric axis of the geodesic surface of the foreground object.

A method according to an embodiment finds a seam or curve in a dynamic programming manner. In an embodiment, dynamic programming includes computing a vertical path of highest values. For example, for each pixel in a vertical row in an image, the value of the pixel is calculated based on the value of the current pixel and the value of one of the three pixels above it.

Figure 16:
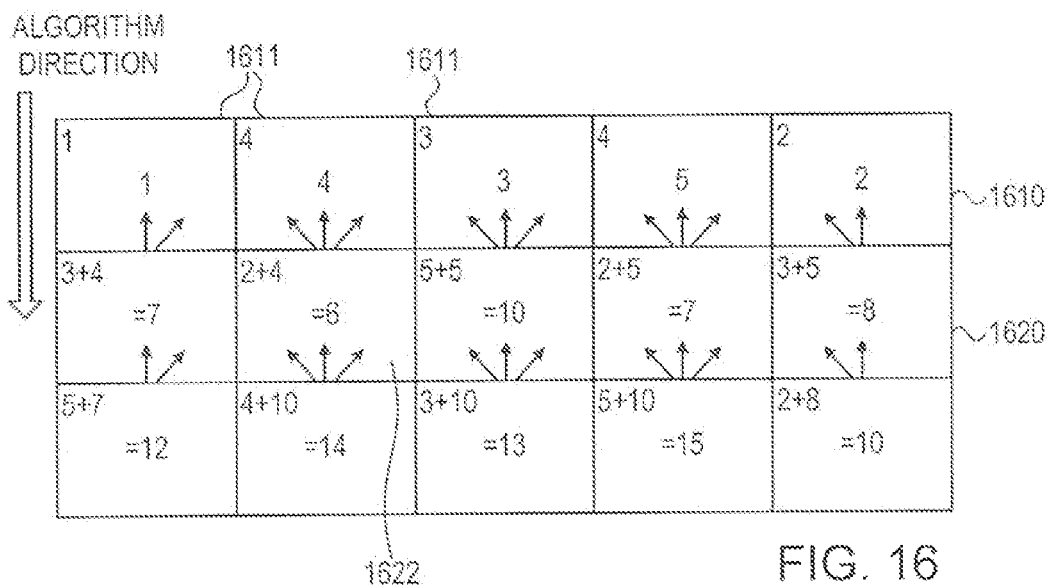
FIG. 16 graphically illustrates determining a curve according to embodiments of the invention.

Reference is made to FIG. 16 that graphically illustrates determining a curve, seam, line or centerline across or along an image according to embodiments of the invention. The squares in FIG. 16 represent pixel in an image. As shown by the row of pixels 1610, the first row has no rows above it, so the sum (as shown by the values 1, 4, 3, 5 and 2) is just the value of the current pixel. A curve, seam, line or centerline across or along an image may be defined or determined based on attributes of an object in an image as further described herein. It will be noted that a curve, seam, line or centerline automatically determined as described herein may not necessarily traverse the center of an object in an image. For example, a curve, centerline or line defined as illustrated by FIG. 18 traverses the left leg of the object and not the center of the object.

Referring to the second row of pixels 1620, and further to the second pixel from left as shown by 1622, the energy value of the pixel is 2. As shown by pixels 1611, a choice of either 1, 4, or 3 values exists. A method according to an embodiment selects the maximal value of the three upper neighboring pixels, in other embodiments, other sets of upper neighboring pixels may be selected or used as described herein. For example, in the case of pixel 1622 and upper neighboring pixels 1611, since 4 is the maximal value, an embodiment of the invention sets the value of the pixel to its energy value (which is 2 in the current example) plus 4 (the maximal value selected from the values of the three upper neighboring pixels). Accordingly and as shown, in this example, the value of pixel 1622 is set to six ("6").

In an embodiment, values for other pixels in the second row are set in a similar way as shown. For example, the value of the pixel immediately to the right of pixel 1622 is set to ten ("10") since, as shown, its original value is five ("5") and the three relevant pixels' values are 4, 3 and five, accordingly, the maximal value of the neighboring pixels is five and the resulting value is 5+5=10. In an embodiment, the process proceeds similarly for all rows of pixels in an image as shown.

Figure 17:
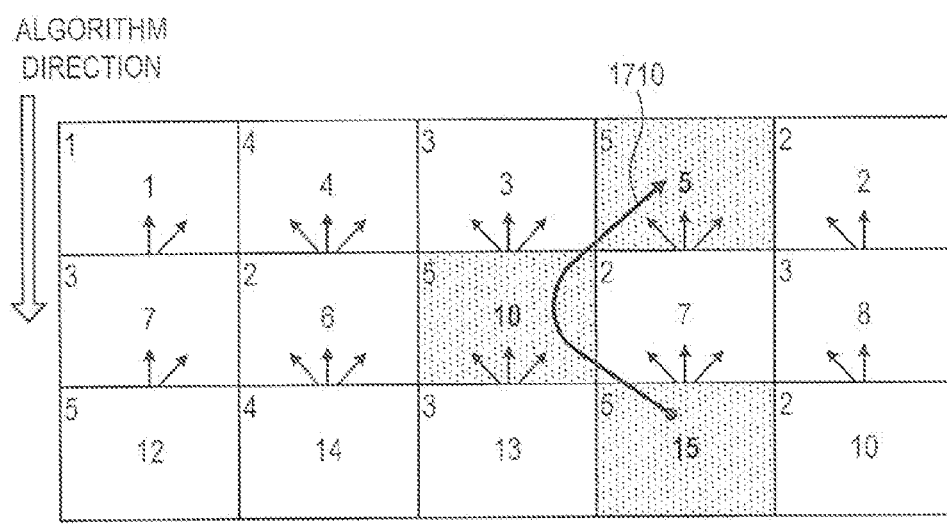
FIG. 17 shows a curve defined according to embodiments of the invention.

In an embodiment, after setting pixels' values as described herein with reference to FIG. 16, a seam, curve or path is produced or defined based on a line that traverses the pixels with highest values in each row. Reference is additionally made to FIG. 17 that shows a seam, curve or path that would be generated or defined based on pixels' and values shown by FIG. 16. As shown, curve, path or seam 1710 traverses pixels with the highest values in each row.

Reference is additionally made to FIG. 18 that shows an output of a seam or curve generation process according to embodiments of the invention. As shown by seam or curve 1811 drawn on image 1810, a seam or curve may be drawn or placed on an original image (e.g., the image shown in FIG. 13). As shown by curve 1821, a seam or curve may be drawn or placed on a filtered image (e.g., on the image shown in FIG. 15). As shown, in an embodiment, a seam or curve produced as described herein crosses the object of interest (e.g., an RO or CO).

As shown by block 1130, a method according to an embodiment computes a weighted covariance on overlapping areas or patches. Reference is made to FIG. 19 which exemplifies computing a weighted covariance according to embodiments of the invention. As shown by areas or patches 1910, in an embodiment, overlapping patches are placed on a seam or curve, e.g., on seam or curve 1811 as shown. In an embodiment, the number of patches and the percentage of the overlap area are linearly and monotonically dependent on the size of the object as exemplified in FIG. 19.

As shown in FIG. 19, by defining and placing areas or patches such that the number of areas or patches and the percentage of the overlapping between patches area are linearly and monotonically dependent on the size of the object, most of the area covered by patches placed on a seam or curve as described covers foreground information. Accordingly, by defining and placing patches as described, the patches are automatically placed on the object of interest and not on background areas.

In case a patch exceeds the boundary of the object, it will contain more of the background information and less information of the object of interest or the foreground portion of the image. In an embodiment, each pixel in a patch is characterized by 5 features—its RGB value and its patch-image XY coordinates, the characterizing 5 features are denoted herein as $\{R,G,B,X,Y\}$. In an embodiment, each such feature is normalized to $[-1, +1]$, e.g., using a method similar to the normalizing method described herein with respect to a $\{R,G,B,X,Y\}$ feature.

According to an embodiment covariance matrix for patches are calculated. In an embodiment, a matrix calculated represents the spatial color and texture information of a patch. A matrix may be unique for each patch due to the different $\{R,G,B,X,Y\}$ of each patch. Some pixels may be less informative than others, for example, since they might be background pixels. Some pixels may be less informative since they are far from the center of the patch. Accordingly, a method according to an embodiment associates a weight to pixels so that a pixel influences a calculated covariance matrix according to how informative it is. For example, an embodiment calculates a weighted covariance matrix according to the formula below:

$$w_i = \frac{\exp\left\{\frac{\alpha_1[(x-\mu_x)^2+(y-\mu_y)^2]}{2\sigma_1^2}\right\}(LRT_f)^{\alpha_2}}{\Sigma\exp\left\{\frac{\alpha_1[(x-\mu_x)^2+(y-\mu_y)^2]}{2\sigma_1^2}\right\}(LRT_f)^{\alpha_2}},$$

where $\alpha_1+\alpha_2=1$, s.t.$\Sigma_i w_i=1$, where in the formula above, $\{x,y\}$ is the coordinate of the $i^{th}$ pixel in a patch, $\{\mu_x, \mu_y\}$ is the center of the patch, and the summation is over all the pixels in the patch.

In an embodiment, a covariance is calculated as follows: weighted mean vector $\tilde{x}$ is given by $\tilde{x}=\Sigma_i w_i x_i$, where $x_i$ is $i^{th}$ pixel in a patch.

In an embodiment, an element $q_{jk}$ of features j and k in a weighted covariance matrix, wCov, is calculated according to the formula:

$$q_{jk} = \frac{\Sigma_i w_i}{(\Sigma_i w_i)^2 - \Sigma_i w_i^2}, \Sigma_i w_i(x_{ij}-\bar{x}_j)(x_{ik}-\bar{x}_k),$$

As shown by block 1145 in FIG. 11, a method according to an embodiment reduces patch dimensionality using Laplacian eigenmap on Riemannian Manifold. Specifically, a method according to an embodiment reduces the dimensionality of the twenty five dimension (25D) weighted covariance matrix described above to three dimensions (3D). In an embodiment, a Gramian matrix is calculated, where for each couple of weighted covariances, $wCov_i$ and $wCov_j$, their corresponding value $A_{ij}$ in the Gramian matrix, A, is calculated by:

$$A_{ij} = \exp\left\{-\frac{[dist(wCov_i, wCov_j)]^2}{\sigma}\right\},$$

where the distance, $dist(wCov_i, wCov_j)$, is the geodesic distance between the covariances, which are positive semi-definite. A method according to an embodiment finds this distance by solving the generalized eigenvalues problem:

$$wCov_i \cdot v = \lambda \cdot wCov_j \cdot v,$$

where the resulting generalized eigenvalues, $\lambda$, are used to calculate the distance $dist(wCov_i, wCov_j)$ by:

$$dist(wCov_i, wCov_j) = \sqrt{\Sigma_i (\log \lambda_i)^2}.$$

Having calculated or obtained A, a method according to an embodiment calculates a diagonal matrix, D, where an element $D_{ii}$ on the diagonal is:

$$D_{ii} = \Sigma_j A_{ij}.$$

Representing the unnormalized Graph Laplacian by $L=D-A$, the generalized eigenvalues problem as known in the art (e.g., as described in http://en.wikipedia.org/wiki/Eigendecomposition_of_a_matrix) is solved in an embodiment by:

$$Lv = \lambda Dv,$$

The first three non-zero eigenvectors are then selected and subtracted from their mean values to produce a new 3D feature vector by:

$$v - \mu_v.$$

In an embodiment, the weighted covariances points produced as described are projected onto a 3D space as exemplified by FIG. 20.

The 3D points shown in FIG. 20 represent the weighted covariances of patches calculated as described herein. A distance between any two points shown in FIG. 20 is proportional to the similarity of the patches the points represent. That is, two points on curve 2010 which are close to each other represent patches which are similar with respect to color and texture. Similarly, two points on curve 2010 which are far from each other represent two patches which are different with respect to color and texture.

In one embodiment, in order to avoid clustering together patches which are similar with respect to color and texture but which further represent patches (or areas) which are far from each other on the actual image plane (e.g., hat and shoes), only adjacent points are connected to produce curve 2010. In an embodiment, the patches are ordered from the top (e.g., head) of the object to its bottom (e.g., feet). According to an embodiment, curve 2010 is produced by connecting adjacent patch-points. Curve 2015 may be produced, calculated or generated by smoothing curve 2010.

In one embodiment, a smoothed curve, e.g., as shown by curve 2015 is produced, calculated or generated by (1) projecting the 3D patch-points onto a 1D dimension (string dimension) using a Laplacian eigenmap technique as described above, where using Euclidian distances in the Gramian matrix and all but adjacent points are set to zero; and (2) for any new point in the 1D axis, reconstructing the 3D representation using embedding. In an embodiment, embedding of a given 1D point in a smoothed 3D point is the weighted average of all the original 3D patch-points, where the weights are calculated according to the distances between the given 1D point to all other 1D points.

As shown by block 1140 in FIG. 11, in an embodiment, key-point segments of the object are determined. In an embodiment, the patch-point string on the 3D space is flatten/unwrapped into a 1D space. For that, a method according to an embodiment may calculate a vector of the square of the Euclidian norm of the gradient of the string in the 3D space according to the formula:

$$str = \|\nabla f\|_2^2 = \left\|\frac{\partial f}{\partial x}i + \frac{\partial f}{\partial y}j + \frac{\partial f}{\partial z}k\right\|_2^2,$$

A cumulative sum, S, of the above expression is calculated by:

$$S_0 = 0, S_{n+1} = S_n + str_i$$

Figure 21:
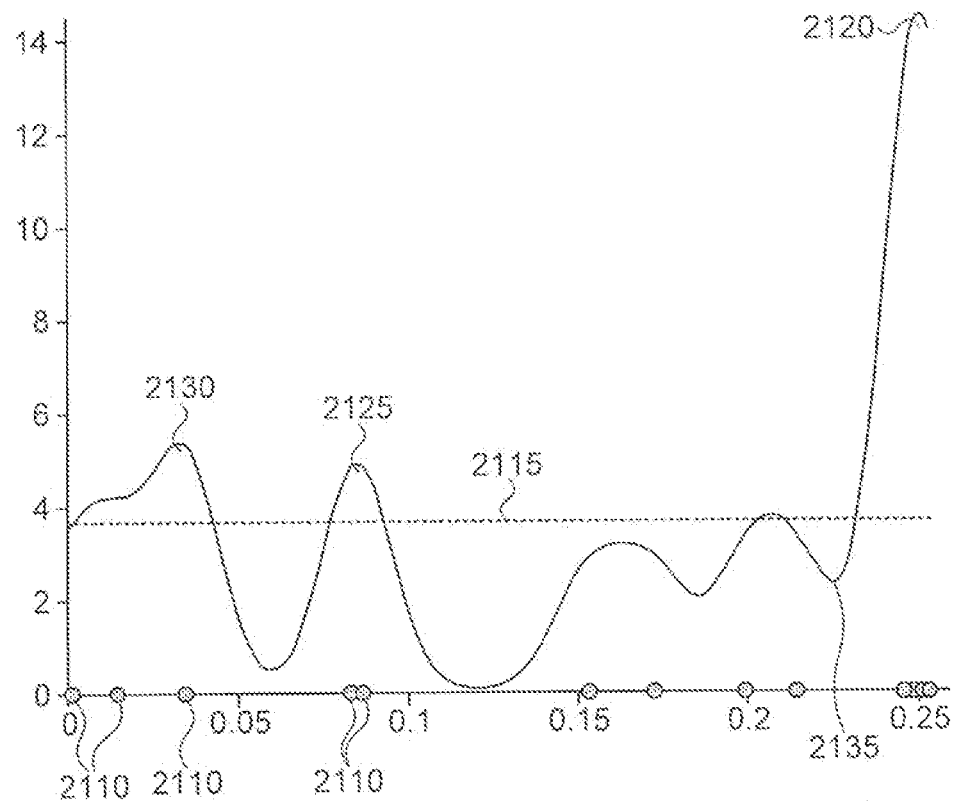
FIG. 21 shows points on a one dimensional space according to embodiments of the invention.

A method according to an embodiment unfolds the geodesic structure of the string that lay on the 3D space into a 1D space, such that the pairwise distances between points on the 3D geodesic structure are most faithfully preserved on the 1D sub-manifold. Reference is made to FIG. 21 that exemplifies points on the 1D space are represented by circles 2110. Circles 2110 represent the patch-points ordered from the top of the object to its bottom and they are positioned next to each other according to their color and texture characteristics.

A method according to an embodiment includes calculating a Kernel Density Estimation (KDE) on patch-points 2110 as shown by KDE 2135 using a Gaussian kernel as shown below:

$$KDE(x) = \Sigma_i f(x; \mu = S_i, \sigma).$$

KDE 2135 represents the distribution of color-texture clusters of the object. A method according to an embodiment sets a threshold as shown by 2115 that cuts the KDE and only preserves highly dense regions. For example, highly dense regions 2120, 2125 and 2130 are identified using the threshold:

$$th = \frac{\sqrt{2\pi}}{3.75 \cdot S_{end}},$$

where $S_{end}$ is the last element of the cumulative sum, S, calculated above.

Regions identified based on a threshold (e.g., as shown by regions 2120, 2125 and 2130 identified based on threshold 2115) represent clusters or segments of similar color-texture patches on the object and which are also relatively big in size. These regions are referred to herein as key-point segments (KPSs). When producing a KDE as described herein, dense areas or regions such as regions 2120, 2125 and 2130 in the KDE can be created only by many nearby patch-points.

Accordingly, a large area on the object, characterized by similar color and texture, would be represented by a few patches which would fall in vicinity on the 1D space and also would pass the thresholding as shown by threshold 2115 and described herein. In an embodiment, KPSs are used for representing the object of interest.

Figure 22:
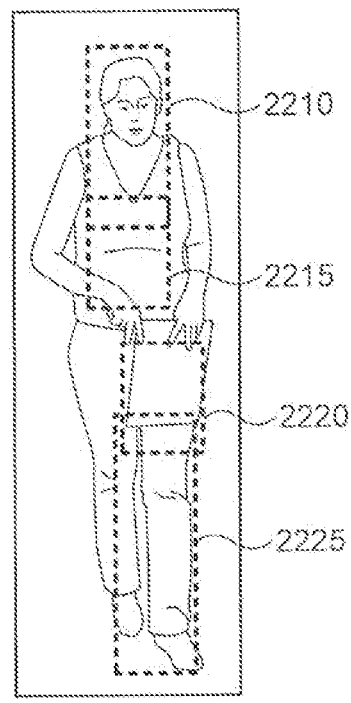
FIG. 22 shows exemplary key-point segments according to embodiments of the invention.

Reference is made to FIG. 22 that shows four exemplary KPSs that are identified by a method in accordance with the current example. As shown, the four KPSs capture or identify four different areas on the object, each of which is different from the others and each is relatively coherent in color and texture. As shown, the four KPSs represent (1) the head and neck area which is dominated by the color and texture of the skin; (2) the shirt area; (3) the paper that the person is holding; and (4) the trousers area.

In an embodiment, an object is represented by a set of covariances, one for each KPS. In an embodiment, a covariance of a KPS is calculated for all the pixels included in the KPS, where each pixels is characterized by 5 features—its RGB value and its segment-image XY coordinate {R,G,B, X,Y}. In one embodiment, a signature of an object is a set covariance of KPSs calculated as described herein. Accordingly, a set of covariance of KPSs calculated for an object (e.g., RO or CO) is also referred to herein as signature of the object. As described herein, a covariance of a KPS or a signature of an object may be unique for the object thus, a signature can be used to identify an object of interest. Signatures of a first and second objects in an image (or in two images) may be used in order to determine whether or not the two objects in the image or images represent the same or different actual objects.

As shown by block 1135 in FIG. 11, a method according to an embodiment includes calculating an image pairwise similarity score between signatures of an RO and a CO. For example, given signatures of two objects (e.g., an RO and a CO), an embodiment of the invention calculates their similarity. As described, each object is represented by a set of KPSs, each of which is represented by a covariance matrix. In an embodiment, a method determines two objects are similar if the set of covariance matrices of one object is similar to the set of covariance matrices of the second object.

An image of an object may be captured from different angles and body poses and holding different instruments (e.g. a handbag), and therefore the number of KPSs may vary between objects. For example and as described, the person shown in FIG. 13 is holding a piece of paper, which is represented by a KPS. Although this piece of paper is relatively discriminative (and can significantly reduce false positives), it may also be reasonable that the same person will not hold or reveal that piece of paper when being captured by a second camera at a different time and location. Therefore, in some cases, not all KPSs of a first object will have a high similarity to KPSs of the second object. Accordingly, an embodiment may determine a match between a first and second objects exists even if only some of the KPSs of the objects are similar. Otherwise described, to determine a match between two objects, an embodiment of the invention may not necessarily impose inter object pairwise similarities to all KPSs of the two objects, but only to as many KPSs as possible. For example, a configuration parameter may be used such that a similarity of three KPSs (or any other number) suffices in order to determine two objects in images represent the same actual or physical object.

In an embodiment, similarities of all KPSs of one object are calculated for all KPSs of a second object and an embodiment of the invention selects the couplings that yield the highest combined similarity score. For example, the distance between two covariance matrices are calculated as before using the geodesic distance and this is formulated into a probability using the exponential family. An embodiment of the invention then looks for a subset of pairwise combinations of KPSs from both objects (e.g., RO and CO) such that a similarity function is maximized, for example, using the formula:

$$\operatorname*{argmax}_{R_s \subseteq R_a, C_s \subseteq C_a, a\_i \in R_s, a\_j \in C_s}$$

$$\left\{ \alpha_1 \cdot \left\{ \prod_{k=1}^{|R_s|} \exp\left(-\frac{[dist(Cov_R^{a\_i(k)}, Cov_C^{a\_j(k)})]^2}{\sigma^2}\right) \right\}^{|R_s|^{-1}} - \alpha_2 \cdot \left(\frac{|R_a| - |R_s| + |C_a| - |C_s|}{|R_a| + |C_a|}\right) \right\},$$

where $R_a$ is the set of all KPSs of the RO, and $|R_a|$ is the number of all KPSs of the RO; $R_s$ is a subset of KPSs of the RO, and $|R_s|$ is the number of KPSs of that subset; $C_a$ is the set of all KPSs of the CO, and $|C_a|$ is the number of all KPSs of the CO; $C_s$ is a subset of KPSs of the CO, and $|C_s|$ is the number of KPSs of that subset; o_i is the index in $R_s$ that points to a KPS that corresponds to a KPS in $C_s$ by an index o_j; $Cov_R^{o\_i(k)}$ is the covariance matrix of the $k^{th}$ KPS in $R_s$; $Cov_C^{o\_j(k)}$ is the covariance matrix of the $k^{th}$ KPS in $C_s$; $\alpha_1$ and $\alpha_2$ are the weights given to the first and second terms, respectively, in the calculation. The first term captures the pairwise similarities of KPSs from the two subsets, $R_s$ and $C_s$. The second term penalizes for KPSs that are excluded from the two subsets, $R_s$ and $C_s$, and this way, small pairwise subsets (e.g., small number of KPSs in $R_s$ and $C_s$ relatively to $R_a$ and $C_a$) with high similarity scores are penalized if they do not include many of the rest of the KPSs in $R_a$ and/or $C_a$. The output is a similarity score $\in [0,1]$.

As described herein, signatures may be generated for an RO and for a plurality of COs. As described herein, a match between each CO in the plurality of COs and the RO may be calculated or determined based on a match between signatures. In an embodiment, a score is associated with each CO based on the match level of the CO and an RO. Accordingly, by associating COs with a score as described, the higher the score, the more probable it is that the CO is the RO.

A system and method according to embodiments of the invention may present search results output to a user in a number of ways. In an embodiment, an ordered or sorted list (or match list) of COs is generated where the sorting or ordering of COs is according to their score. In an embodiment, a CO is promoted in the match list according to its match score. In an embodiment, COs with higher scores are presented first to the user, e.g., based on the ordered or sorted list. The user can define the number of top matched COs from the match list to be presented on his screen. For example, based on input from a user that indicates ten ("10") COs are to be presented, an embodiment of a system may present to top COs in an ordered or sorted list thus presenting the user with the ten images of COs which are most likely to be images of the RO. In another embodiment, a user may define a match level or score as a threshold, in such case, based on input from a user, a system will present the user with images of all COs associated with a score that is at least the same as, or is higher than, the score indicated by the user. Accordingly, in an embodiment, a user defines a score threshold to the system, and the system presents only COs that have a score equal to, or higher than that threshold.

Figure 23:
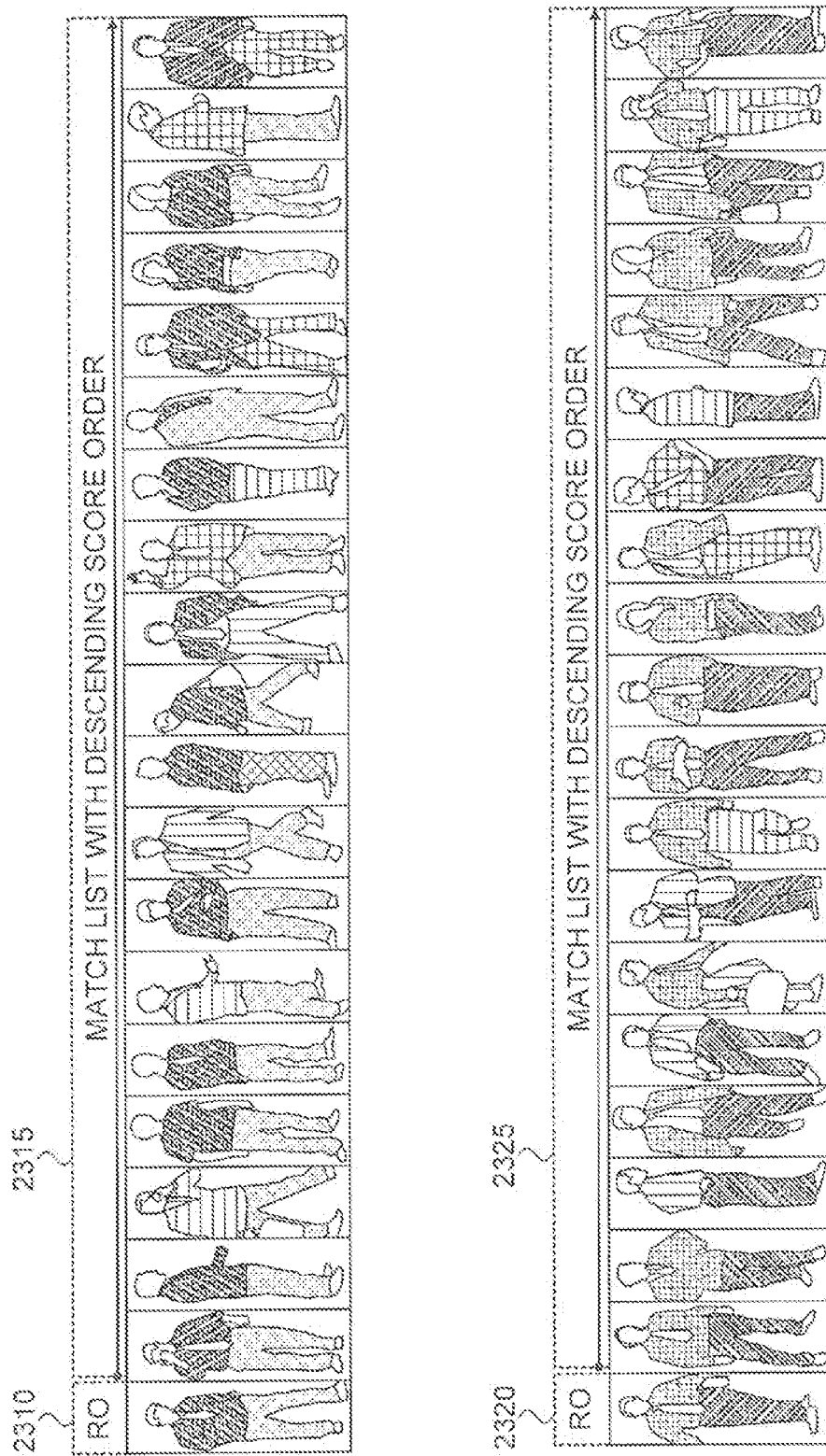
FIG. 23 shows exemplary outputs of a system and method according to embodiments of the invention.

An embodiment of a system and/or method may provide graphical output to a user. Reference is made to FIG. 23 that shows exemplary outputs of a system and/or method according to embodiments of the invention. As shown by RO 2310, an image of an RO may be presented, e.g., on a display screen. As shown by COs 2315, images of COs may be presented alongside an image of an RO. For example, images of COs 2315 may be presented according to their score which is associated with the COs as described herein. For example, COs 2315 may be presented according to a descending score order such that the CO associated with the highest score is the one closest to RO 2310 and the CO presented at the far right is the CO associated with the lowest score. Similarly, COs 2325 are presented according to a descending score order such that the image of the CO shown right next to the image of the RO 2320 is the one most likely to be an image of the object of interest or the RO. Accordingly, COs images may be presented based on a sorted or ordered match list that may be generated as described herein. An embodiment of a system may present a CO or RO as an image snapshot, cropped around the CO or RO in a frame or as an entire frame with the CO or RO marked in the frame. In some embodiments, images or stills images may be presented and in other embodiments of cases, video clips may be used. For example, an embodiment of a system may present a short video clip of a CO trimmed slightly before and after a time tag of the CO in a video channel.

As described, an embodiment of a system and method may search for a suspect (e.g., an RO) in input provided by a plurality of cameras. For example, a large number of cameras located in various locations in an airport may all provide input to an embodiment of a system that may search for a suspect based on an image of an RO as described. However, searching for a suspect by examining a large number of videos inputs may be costly in terms of time and computing resources and may not always be the most efficient way for finding the suspect.

In some embodiments, a relevancy search list (RSL) may be generated or provided and may be used in order to improve efficiency or speed of a search. An RSL may be any suitable list that may be stored, e.g., in a file or memory and used by a computerized embodiment of a system. In an embodiment, an RSL is a list of cameras which are relevant to an RO's plausible whereabouts and are therefore included in the RSL and used in a search for the RO. In an embodiment, an RSL is calculated automatically by a system or method according to RO's speed, location and time and taking into account camera's location. For example, given a location of an RO, a speed and direction at which the RO is moving, an RSL is generated such that all cameras that may capture an image of the RO are included in the RSL and other cameras are excluded from the RSL.

For example, a suspect search embodiment of a system generates, or is provided with, an RSL that only includes some of, typically many, video channels. An embodiment of a system or method may then only search for an RO in input provided by the cameras included in the RSL. Accordingly, a search for an object of interest may be improved by only searching the object of interest in input from relevant cameras. An RSL may include cameras based on a location or other parameters. For example, an RSL may include a subset of cameras selected from a set of cameras where the subset is selected based on location. For example, an RSL may include cameras in a specific location and exclude cameras in other locations. For example, if the location of an RO is known then an RSL may only include cameras in the location of the RO.

Input provided to an embodiment of a system or method may include (or reference) all available video channels that are defined in the system or it may only include video channels that the system or the user infers as plausible locations for the RO to appear in. The plausibility of a video channel may be calculated based on prior knowledge of Object Geographic Locations (OGL) of a video camera and of the RO and on time indications and/or velocity of the RO. Accordingly, An embodiment of a system and method may avoid searching an RO in implausible locations, and thus reduce computational resources and time needed in order to find or locate an RO.

Furthermore, by only searching for an RO in input based on an RSL, false positives (e.g., processing COs in implausible video channels which mistakenly gain high similarity scores) may be reduced. For example, if an image of an image of an RO was captured on a certain camera located at coordinate $OGL_1$ and at time $t_1$, and the maximal velocity of the RO is determined as v, then only video channels that are currently (at time $t_2$), close enough to $OGL_1$ would be included in the RSL. For example, the plausible video channels are provided from cameras that are located within a radius of, for example and simplicity, $R=(t_2-t_1) \cdot v$, from OGL1.

It will be understood that an RSL described above only one example and other logic, methods or systems may be used to generate an RSL. A user or an embodiment of a system may override, change or modify an RSL directly by including or excluding channels. An RSL may be calculated on-line or off-line and may be updated on-line. An update of an RSL may be done automatically by an embodiment of a system or it may be done by a user. In an embodiment, an RSL is included in search parameters used by an embodiment of a system as described herein.

An embodiment of a system or method may search for an RO according to a mode. For example, an embodiment of a system and method may search for a suspect in on-line or real-time mode or the system or method may search for a suspect in off-line mode.

When operating in on-line or real-time mode, an embodiment of a system may search for a suspect or RO in real-time on one or more live video streams captured by the system. In an embodiment, video streams are analyzed in real-time by a suspect search system. Accordingly, COs that enter a field of view of any given video channels are immediately analyzed in real-time by the suspect search system. A real-time or on-line mode produces an immediate search on COs that are extracted from live video.

In another mode of operation, an off-line mode, a suspect search embodiment of a system searches for an RO in recorded video streams, for example, a video stream that was recorded by the system before conducting the search. For example, after a search is initiated by a user or by an embodiment of a system, the suspect search system will start the search on the recorded video stream. A possible operation mode for the off-line mode may be used to ease a future search, by producing a pre-processing stage after the video has been recorded. In this mode, after the video is recorded, an embodiment of a system only analyzes it to create or identify COs through the stages described hereinabove (e.g., the sliding windows and areas of motion) and through the method to create signatures for the COs, such as described with reference to blocks 1110, 1115, 1120, 1130, 1145, 1140 in FIG. 11. In this mode, matching those COs' signatures as described herein (e.g., with reference to block 1135 in FIG. 11) to an RO's signature is initiated only after a search is initiated (e.g., an RO to be searched for is provided).

For example, an embodiment of a system may determine, identify or extract features of COs in recorded video streams and may create signatures for these COs. These signatures of COs and other data may be stored and indexed in a database.

It will be noted that signatures for COs may be generated and stored even when no search is initiated. For example, if servers in an embodiment of a system are not required to perform other tasks, the servers may continuously generate signatures of people in an area and store the signatures. Accordingly, when a search for a suspect is initiated, an embodiment of a system may already have signatures of people in the area and may thus quickly identify the suspect as described using signatures of COs that were generated prior to the initiation of the search. Accordingly, an embodiment of a system may use currently available computing resources in order to speed-up future searches for suspects.

User feedback may be received, and a new search may be performed based on user feedback. For example, after COs are presented to the user along with their similarity scores with respect to the RO as described (e.g., with respect to FIG. 23), the user can provide a feedback to an embodiment of a system about those results. For example, a user may click on any one of images 2315 and indicate, using a popup menu, whether or not the specific image of a CO is similar to the RO. Feedback may be, for example, the correctness of the match, e.g., a True/False selection. In an embodiment, algorithmic parameters are modified and/or adjusted based on user input or feedback. For example, thresholds, factors or constants used by the IPSSM as described herein may be changed based on user input.

For example, some of the correct COs, e.g., COs tagged or indicated as correct by the user, are in fact the RO (e.g., when captured in different appearance, from a different angles, under different light conditions and the like). For example, some of the COs presented as shown by CO images 2325 are images of RO 2320 captured in or under different viewing angles, different poses or illuminations. Therefore, executing a new search on such COs may bring new results to match to the COs, which were not found in a previous search for the RO. As more correct COs are found by an embodiment of a system and approved by user feedback, additional or new searches may be initiated.

Accordingly, a set or bank of correct results or matching COs may be generated. As more and more correct or matching COs are collected (e.g., stored in association with an RO), the ability of an embodiment of a system to identify and/or locate the RO is increased. For example, using a bank or collection of matching COs, an embodiment of a system may identify an RO in distant locations and/or different times since a signature of the RO is improved when more and more matching COs are obtained. The signature of an RO may be enriched or improved based on additional signatures that capture the RO in different body posses, from different viewing angles etc. Any method of enriching or improving a signature based on a plurality of additional or other signatures may be used. For example, averaging or weighted averaging of values in a set of related signatures may be used in order to enrich or improve a signature.

Figure 24:
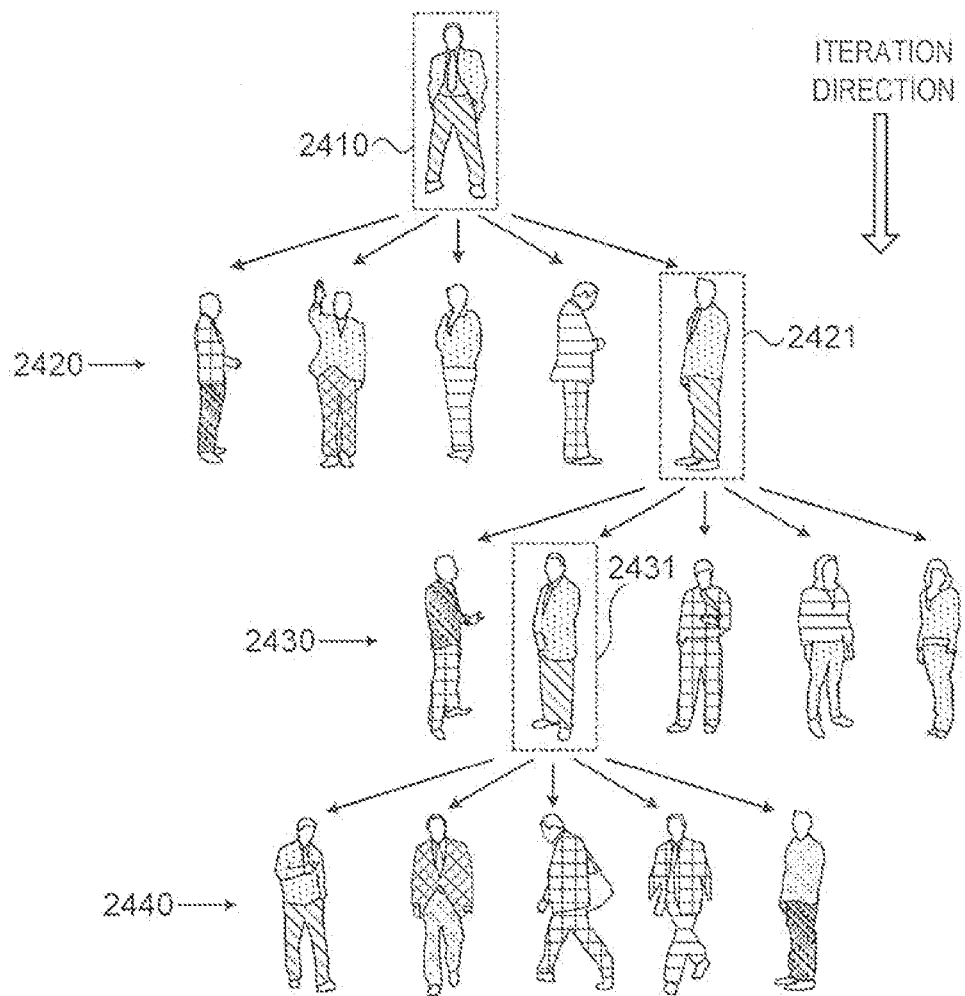
FIG. 24 graphically illustrates a progressive search according to embodiments of the invention.

An embodiment of a system and method may perform a progressive search based on user input. Reference is made to FIG. 24 that graphically illustrates a progressive search based on user input. As shown by CO 2410, a CO may be selected by a user. For example, a user selects CO 2410 as a CO that matches an RO being searched.

As shown by images 2420, a set of COs may be presented to a user. For example, based on CO 2410, an embodiment of a system selects COs 2420 and presents selected CO to a user. As shown by CO 2421, a use may select CO 2421 as a good or matching CO. Next and as shown by COs 2430, an embodiment of a system and method uses CO 2421 indicated by the user to generate or select a subsequent set of COs 2430. As shown by CO 2431, the user may select the best matching CO from the new set 2430. As shown by COs 2440, a new or subsequent set of COs may be generated or selected and presented to a user. Iterations in a flow shown in FIG. 24 may continue until a user terminates the flow according to an embodiment. Accordingly, a flow according to an embodiment may include any number of iterations where in each iteration, user input is used in order to select COs for the subsequent iteration. For example and as described, a user approves or selects a correct CO or a number of COs and a new set of COs is selected based on that user selection.

An embodiment of a system may select, from a set of COs, a CO that best matches the RO and, based on the selected CO, search for additional COs that match an RO. As described, a match of one or more COs with an RO may be based on signatures of the COs and the RO. For example, an iterative process described herein selects a set of COs, and then selects by itself, or receives a selection by the user, of a best match from that set of COs and, based on that best matching CO, searches and finds additional COs. For example, an embodiment of a system receives a selection or indication of a best matching CO from a user and uses the selection received from the user in order to initiate a new search on that best matching CO and find additional COs.

In another embodiment or example, a correct CO which looks different from the RO can be used to find new, yet undiscovered COs in a next iteration. For example, as indicated by a user, a CO that does only partially matches an RO is used in order to enrich a set of COs and the new, enriched set of COs is then presented to the user. Accordingly, an iterative process can be realized, whereby COs are indicated, by a user, as matching the RO are then used to find additional COs.

In an embodiment, a system automatically selects, from a set of COs indicated as matching an RO, the CO that is the least similar to the RO and a new search is initiated for that CO. Accordingly, the diversity in appearance of new correct COs is enlarged such that more possible COs that match an RO are considered.

It may be desirable to find a large number of images of an RO. For example, after a signature for a person is generated as described herein, the signature may be improved by analyzing additional images of the person. By obtaining additional images of a person or suspect, an album for that person or suspect may be created and may include a number of images of the suspect. To extend the set of images of a suspect or an RO, an embodiment of a system and/or method may select a CO, from a set of COs that are already indicated by a user as matching an RO. The signature of the selected CO may be used to identify additional COs.

For example, a selected CO (from a set of COs that are already indicated by a user as matching an RO) may be a CO that is least similar to the RO, or it may be a CO that was acquired at a time that is the furthest from the time the image of the RO was acquired. In other embodiments, a selected CO may be a CO that was acquired at a location that is the farthest from the location of the RO or it may be a CO selected by the user to be used in finding additional images of an RO.

Figure 25:
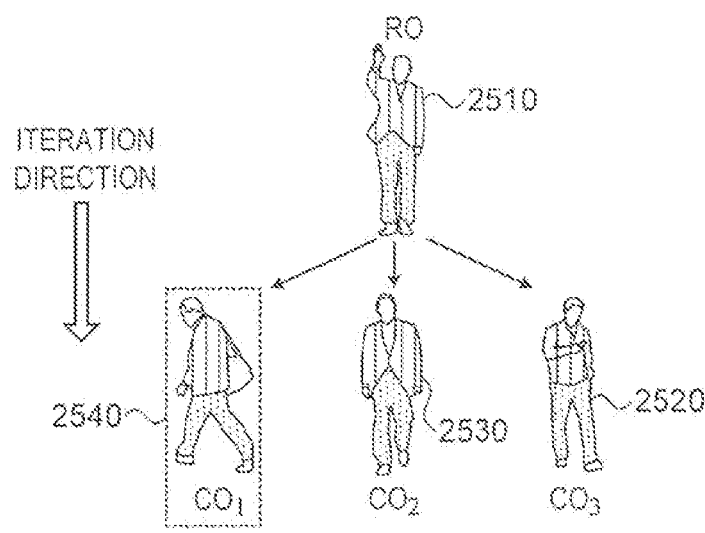
FIG. 25 shows an exemplary object of interest and a an exemplary set of candidate objects according to embodiments of the invention.

Reference is additionally made to FIG. 25 that shows an RO and a set of COs. FIG. 25 exemplifies a method of selecting a CO from a set of matching COs according to the invention. In this example, a user has selected COs 2520, 2530 and 2540 as COs that correctly match RO 2510. A CO selected or indicated by a user as correctly matching an RO is also referred to herein as a "correct CO". If the user indicates or selects a number of COs as correct COs then some of the COs may match the RO more closely than others. For example, a least matching (but still correct) CO may be a correct CO that matches the RO less than other COs in a set of correct COs.

As shown, while COs 2520 and 2530 seem similar to RO 2510 in body pose, CO 2540 does not look similar to RO 2510 in body pose. In this exemplary case, an embodiment of a system may select the least matching correct CO, namely, CO 2540 in this case.

By selecting the CO that least matches the RO and using the selected CO for searching for additional COs, an embodiment of a system enlarges the set of COs that may be presented to a user. For example, an embodiment of a system calculates a signature of CO 2540 as described herein and uses the signature to find additional COs by relating the signature of CO 2540 to signatures of COs in a set of COs. Accordingly, by deliberately choosing (e.g., from a set of COs indicated as correct COs by a user) a correct CO that least matches an RO, an embodiment of a system enriches or enlarges a set of COs provided to a user.

In another embodiment, a system selects a correct CO from a given set of correct COs based on a time constraint. For example, a correct CO may be selected from a set of correct COs if the time the image of the CO was acquired is the furthest (advanced) from the time the image of the RO was acquired, as the most recent CO is desired in order to know it most recent location. For example, a time stamp may be provided by cameras that acquire the images and the time stamp may be associated with images or video streams provided to an embodiment of a system. For example, an embodiment of a system or method may choose one of the correct COs 2520, 2530 or 2540 based on a time stamp associated with these COs such that the chosen CO is the most recent or such that the chosen CO is the one closest in time to the time to RO 2510. As referred to herein, "a time of the RO" is the time an image of the RO was acquired. Similarly, "the most recent CO" is determined based on the time images of COs were acquired. As described, cameras 220 may stream video or images that include a location and timestamp. Accordingly, it will be understood that components of a system 3000 or other systems according to embodiments of the invention may readily determine a time and location of an RO or CO. As described, after choosing a CO, a process of finding additional COs and presenting the additional COs to a user may be repeated.

In another embodiment, a system chooses a CO from a set of COs indicated as matching (e.g., from a set of COs indicated by a user as matching an RO) based on location data. For example, in an embodiment, cameras that provide input to an embodiment of a system also provide their location. Accordingly, COs identified in video streams or image may be associated with location information, e.g., information as provided by a global positioning system (GPS) as known in the art. For example, cameras providing input to an embodiment of a system as described herein may be fitted with a GPS unit and may include positioning information in data provided to an embodiment of a system. An embodiment of a system may choose, from a set of COs, the CO that is the farthest (most remote or distant in space) from the location of an RO and use the chosen CO in order to search for additional COs by relating the signature of the chosen CO to signatures of other COs. Accordingly, in an embodiment, a system chooses the next correct CO (for the next iteration of finding additional COs and presenting them to a user) according to a location indicator of the correct COs.

As described herein, the RSL may be generated based on a plausible geographical search radius of the RO's whereabouts, and consequently the cameras on which to search for COs. For a next search iteration in an iterative process as described, an embodiment of a system may choose a next correct CO, by choosing a CO that is the farthest from a location of the RO. By selecting a CO that is far from a known location of the RO, the next search iteration would begin with respect to a location far from a known location of the RO and a new plausible geographical search is performed which includes new area and/or new cameras, e.g., using input from additional cameras. This may add additional information about the RO's whereabouts, or current location.

Reference is made to FIG. 26 that graphically illustrates a process according to embodiments of the invention. As shown, RO 2610 is identified and/or selected by a user as described herein. As shown by circle 2611, an area (e.g., based on a predefined radius) is defined and COs in the area or search radius defined by the radius are examined. For example, an RSL is used to select cameras in a distance of the search radius from the RO. As shown by 2620, the CO which is the one far most from RO 2610 is selected and a new search radius as shown by circle 2621 is defined, e.g., using a second RSL. For example, a user is presented with all COs around RO 2610 and CO 2620 is selected since it is the one having the greatest distance from RO 2610. In an iterative fashion, the CO which is the far most from CO 2620 is selected as shown by CO 2630 and a new RSL and search radius is next defined with respect to CO 2630 as shown by circle 2631. Similarly and as shown, a search radius 2641 is defined around CO 2640.

In another embodiment, a method based on supervised learning is incorporated. For example, supervised learning is done on a training data set of samples, where the training samples include positive and negative samples. Positive samples are signatures of couples of similar objects, e.g. RO and COs of the same object, and negative samples are signatures of couples of dissimilar objects, e.g. RO and COs of different objects. User feedback may be used for tagging those couples as either positives or negative training samples. Supervised learning may include receiving input or feedback from a user. Such a supervised learning embodiment of a system can learn the similarity function (e.g. via a machine learning classifier such as Bayesian networks or support vector machines (SVM)) based on the training dataset and hence produce good matching performance. Such an embodiment of a system may run alongside other methods or units described herein (e.g., IPSSM). In an embodiment, results from a number of methods and units described herein are merged into a single signature or similarity score.

For example, a set of signatures of objects of interest and a corresponding set of signatures of candidate objects, which were determined by a user as respectively matching the objects of interest, may be provided to a classifier in order to train or teach the classifier. Similarly, a set of objects of interest and a set candidate objects which were determined by the user as not matching the set of objects of interest may be provided to a classifier in order to train the classifier. For example, provided with an object of interest and a candidate object (e.g., in the form of images of an RO and CO) and further informed that the candidate object matches the object of interest, a classifier may automatically identify features that may need to be same or similar in order to determine a match. For example, provided with two images and an indication that both images are of the same person, a classifier may record significant features in the two images as features that may indicate a similarity. A classifier may record features that may not be significant and thus, even though not similar in a first and second images may not necessarily indicate that the first and second images are not images of the same object. For example, provided with sets of images and an indication whether or not the images in the sets are of the same object, a classifier may automatically determine that an intensity, hue or other attributes in an image are not necessarily significant when comparing images while the height and/or size of an object is significant. In an embodiment, the classifier may be a processor or controller. For example, in an embodiment, the classifier is, or implemented using, controller 3105 described herein. For example, executable code 3125 may include instructions that when executed by controller 3105 cause controller 3105 to perform classification as described herein.

As described herein, an embodiment a suspect search system may search for a suspect or other object of interest based on an overall image-appearance of the RO in video channels. However it will be understood that an embodiment of a system or method may combine and integrate other modules that include a sensor and a corresponding search and match algorithm. Examples of such modules may be a face recognition (FR) module and/or a license plate recognition (LPR) module. For example, if the face of the RO is given or known (e.g., captured by a camera), an FR module may search the face in COs produced, defined or provided as described herein. For example, an FR module may search for a face in video channels and may report or indicate to an embodiment of a suspect search system COs that match an RO based on FR processing. An FR may be made to process COs based on an RSL such that COs in an area of interest are examined for a face similarity with respect to an RO.

An embodiment of a suspect search system may then combine the results from an FR module with search results produced as described herein such that a score associated with a CO is based on multiple units or modules. In some embodiments, a set of CO presented to a user as described herein is selected based on a search as described herein and based on input from an FR module, in other embodiments, separates sets may be presented, e.g., a first set produced as described herein and a second set produced by an FR module. Accordingly, high accuracy may be achieved by combining a plurality of search modules and techniques that may all search for a matching CO based on a set of COs produced as described herein.

Another module or method that may be included in an embodiment of a system may be related to LPR. For example, in case a human RO has entered a vehicle at one area, headed to another area, its image-appearance may no longer be visible to the cameras and thus, an image of the RO may no longer be available to the system. If a license plate number of a suspect vehicle is given, then an LPR module may search for it in video channels, and update and guide the suspect search system on a new and remote location of the RO. An LPR module may connect an embodiment of a suspect search system to distant areas of video channels. Combining an LPR module may increase the ability for a continuous search of a human RO in remote and separated areas.

Any other suitable or applicable sensors may be used to enrich a signature of an RO or CO. Examples of additional sensors may be a Bluetooth and/or Wifi modules that may provide signal signatures. For example, a WiFi or Bluetooth signal identification ("ID") (such as a unique MAC address) may be used as a signature or it may be included in a signature. For example, if the signal ID of a device operated by a CO is similar to the signal ID of a device operated by an RO then the CO may be selected as a matching CO. In other embodiments, the signal strength or other attributes or properties of a device may be determined and included in a relevant signature.

As described, WiFi signals produced by wireless devices may be used to produce WiFi data for ROs and COs. For example, WiFi data may include a media access control (MAC) address is extracted from WiFi signals. In other embodiments, patterns of WiFi may be identified or recorded. For example, signal strength, bandwidth used and the like may all be determined by analyzing captured WiFi signals and may be included in WiFi data associated with an RO or with a CO.

In one embodiment, a system (e.g., system 3000) interacts with an external system that provides spatial coordinates of a wireless device based on its WiFi transmission. For example, a system including a set of WiFi access points (AC) and a computer may deliver location information of WiFi devices as well as other WiFi data as described above.

The WiFi location information from an external system may be compared to a location of an RO and/or CO in order to associate a WiFi device with an RO or CO. Any other method for associating a WiFi device with a CO or with an RO may be used without departing from the scope of the invention.

In an embodiment, if a WiFi device is associated with an RO or CO then the WiFi data of the WiFi device may be used to generate a signature of the RO or CO. For example, the MAC address of a WiFi device may be associated with an RO and, when determining whether or not a CO is similar to the RO (e.g., when calculating a similarity score for the CO), the MAC address of the RO may be compared to a MAC address associated with the CO. Other parameters (e.g., signal strength, bandwidth and burst patterns) may be used in calculating a similarity score for the CO. Accordingly, WiFi signals may be used to generate an independent and informative signature that would help discriminating between objects. In other embodiments, a WiFi signature generated as described may be incorporated in a similarity signature described herein.

In an embodiment, if it is determined that an RO generates WiFi signal, COs that generate WiFi data may be examined and their WiFi data may be compared to WiFi data of the RO. If a CO that has the same MAC address as the RO is identified then it may be assumed the CO and RO are related to the same person. Various algorithms or heuristics may be used. For example, if it is known the RO carries a WiFi device and a CO does not produce any WiFi signals, the CO may not necessarily be rejected, rather, its similarity score may be decreased since, for example, the RO may have turned off his or her device. Similarly, even if the RO is not associated with a WiFi device it is expected that a matching CO will produce no WiFi signals (or be associated with any WiFi data). However, an embodiment of a system and method may not necessarily reject COs that produce no WiFi signals, since, for example, the RO may turn on his or her device at any time and therefore, a CO that has WiFi data may be relevant.

In another embodiment, if a WiFi signal cannot be directly associated with an RO or CO then a bank of WiFi signals in the area of the RO is generated and stored, e.g., by interacting with a WiFi network in an airport and storing WiFi data objects on a server. It may be assumed that one of the WiFi data objects belongs to the RO, however, it may also be the case that the RO was not producing a WiFi signal at the time the RO image was captured. In an embodiment, a CO that produces one of the WiFi signals included in that bank of WiFi signals would have a higher a priori probability to be the correct CO. For example, a similarity score of the CO is increased.

In an embodiment, the score is only increased up to a predefined value since there is no certainty which of the WiFi signals in the bank actually belongs to the RO, and, as discussed, the RO may not be producing any WiFi signal at all. Similarly, if a CO does not produce any WiFi signal, it may not necessarily be rejected.

In order to isolate the correct WiFi signal (the one that belongs to the RO) from the bank of WiFi signals, (e.g., during a search process (e.g. by the IPSSM)) results of COs from multiple cameras are generated, then an embodiment of a system looks for a repetitive WiFi signal among the results and the more repetition a WiFi signal gets in multiple cameras, the higher the chances that it belongs to the RO (the correct WiFi signal).

In an embodiment, messages (e.g., public messages) related to social networks such as the Twitter and Facebook networking systems, may be used. As known in the art, messages sent or posted over social networks may include an identifier that identifies the sender of a message or post. In an embodiment, a receiver (e.g., a receiver configured to capture radio frequency (RF) signals) in a location may capture any RF transmission including social network public messages or posts. For example, a receiver in a location such as an airport terminal may receive and/or capture all the public messages transmitted by all users in a given period of time and location.

A unique ID attached to, or included in, a public message may be used to associate an RO with a CO, for example, by determining that both the RO and CO transmit public messages that include the same user ID. An association of an RO to a CO based on social network public or other messages may be done in a number of ways, e.g., directly or indirectly. Directly, e.g., by determining the ID of an RO and thereafter a CO which transmits public messages that include the same user ID as that of the RO may be assumed to be the same person as the RO. Indirectly, e.g., if a public message ID cannot be directly associated with an RO or a CO then a bank of public message IDs in the area of the RO is generated and stored. It may be assumed that one of the public message IDs belongs to the RO. In an embodiment, a CO that produces one of the public message IDs included in that bank of public message IDs would have a higher a priori probability to be the correct CO. For example, a similarity score of the CO is increased. The way of associating an ID to the RO and the way of updating its similarity score can be done as described herein with respect to WiFi signals.

If a user ID in transmitted social network messages of an RO was identified or determined by an embodiment of a system, then the ID may be used to obtain, from a social network, further information related to the RO.

For example, using a social network identification of an RO (e.g., an ID in a public message as described), a user account or profile of the RO in a social network may be accessed and any information may be obtained therefrom. For example, RO's name, pictures, connections, posts, statements, place of work, intensions, group memberships, etc may all be determined or obtained. For example, using an identification of an RO in Facebook, the RO's profile or "wall" may be accessed and images of the RO may be obtained therefrom. Any information obtained from a social network may be used in generating a profile for an RO or CO. For example, pictures of the face of an RO obtained from a social network may be used as reference images when searching for the RO.

Messages related to social networks captured and analyzed as described herein may be used in several ways. For example, an album generated for an RO or a CO may be enriched using images downloaded from a social network. In another example, images obtained from a social network may be used to improve a signature. In yet another example, a user profile may be generated for an RO or a CO based on information downloaded from a social network.

Reference is made to FIG. 27 that shows an exemplary screenshot according to embodiments of the invention. As shown, an image of a location may be presented to a user. As shown by button 2710, a user may press a button to cause an embodiment of a system to receive an indication of an RO. For example, following a press on button 2710, a user clicks on an image of a person as shown by 2720 to indicate the person is the RO. As shown, a user may define or draw a bounding box around an RO. For example, a user may press and hold a mouse button and further drag a cursor to draw a box around a specific object in an image. It may also be possible that objects in the frame already have bounding boxes marked on or around them (e.g., by a tracking system or algorithm) and the user only selects one of those boxes. As shown by button 2730, after indicating or marking an RO, a user may press a button to cause an embodiment of a system to begin a search for the RO.

In another embodiment, a system may automatically draw a bounding box around an object. For example, a user clicks on a human image in the frame, and an embodiment of a system may use any image processing technique in order to identify a human object near the area of the mouse click in an image and may further draw a bounding box around the person. The bounding box may be used as described herein to identity and determine foreground and background in the hounding box and generate a signature.

Reference is made to FIG. 28 that shows an exemplary screenshot according to embodiments of the invention. As shown, a user may define or select search parameters to be used by an embodiment of a system in order to search for an RO. As shown by selection box 2810, a user may select the cameras that will provide input to an embodiment of a system. For example, if a user only wants an embodiment of a system to search for a suspect in a specific terminal in an airport then the user will select only cameras located in the specific terminal. Multiple cameras may be selected.

As shown by selection menu 2820, a user may select an area in which to search for a suspect or RO. For example, areas may be preconfigured in an embodiment of a system by associating cameras with defined or preconfigured areas such that a user can simply select an area and thus cause the system to search for a suspect in the selected area. Multiple areas may be selected.

As shown by box 2830, a camera may be selected and as further shown by selections 2831, a time constraint for a selected camera may be selected. For example and as shown, a time period (e.g., from 09:00 until 13:15) may be selected. Based on a time selection, an embodiment of a system may search for a suspect in video or images acquired during a specified time period. Accordingly, a user can cause an embodiment of a system to search for a suspect in a specific area and during a specific time period. As shown, a time constraint may define a future time. For example, using selections 2831, a user can instruct an embodiment of a system to search for a suspect in the next day or in the next week. Any other time period or duration may be selected.

As described herein, an iterative process may find a set of COs that match an RO, select, from the set, a CO and, based on the selected CO, perform a subsequent search for additional COs. As shown by selections 2832, in an embodiment, the mode or method of selecting a next CO for an iterative process described herein may be selected. For example, selecting "user selects next CO" will cause a mode of operation whereby the user selects the next CO based on which a search will be conducted. As shown, other selection may cause an embodiment of a system to select the next CO based on time, similarity or location as described herein.

Figure 29:
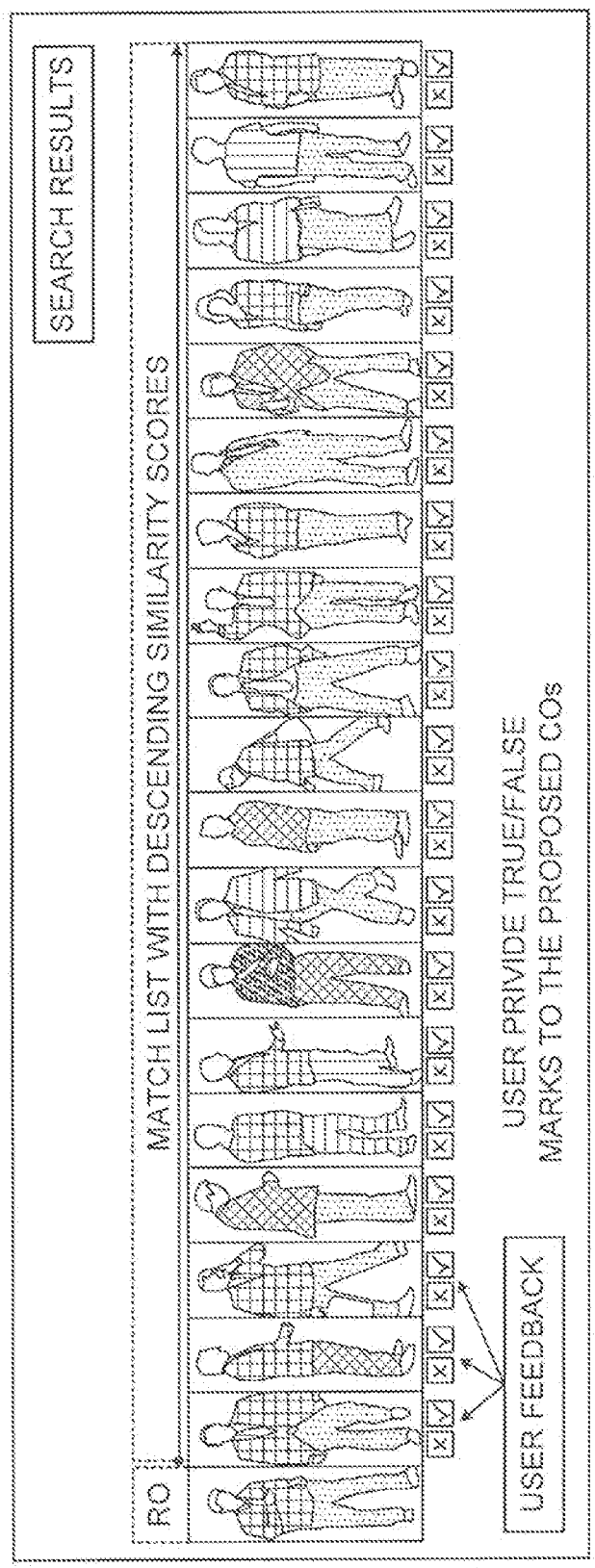
FIG. 29 shows an exemplary screenshot according to embodiments of the invention.

Reference is made to FIG. 29 that shows an exemplary screenshot according to embodiments of the invention. As shown, an RO may be presented and a set of matching COs may be displayed near the RO. As further shown, a user may indicate whether or not a CO is a correct or relevant match. For example and as shown, check boxes placed under each CO enable a user to indicate the CO is a correct match (e.g., by clicking the "v" box) or a bad match (e.g., by clicking the "x" box). An embodiment of a system may then use both bad matches and good matches in order to refine a search, find additional COs or otherwise continue a search for an RO as described.

Figure 30:
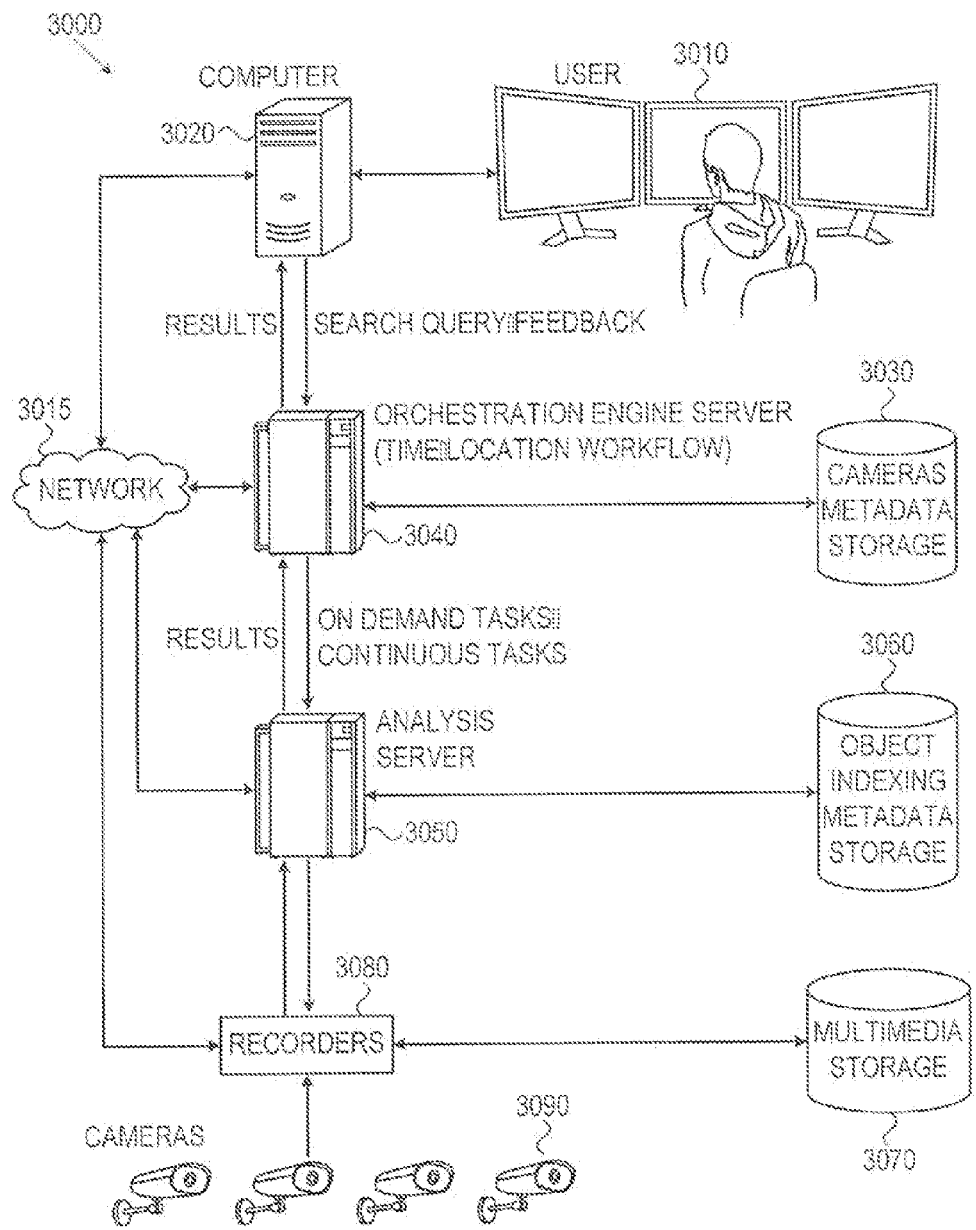
FIG. 30 shows an exemplary system according to embodiments of the invention.

Reference is made to FIG. 30 that shows an exemplary system 3000 according to embodiments of the invention. As shown, an embodiment of a system may include a computer 3020 and one or more displays 3010 connected to computer 3020. In an embodiment, computer 3020 receives search requests from a user. In an embodiment, computer 3020 receives feedback from a user. For example, computer 3020 presents data as shown in FIGS. 27, 28 and 29 and receives user's input as described herein, e.g., with reference to FIGS. 27, 28 and 29. For example, computer 3020 presents on displays 3010 images of a scene (e.g., images of people in a public place such as a train station or airport terminal). In an embodiment, a user selects an RO displayed on screens 3010 thus indicating an RO to a system. Using screens 3010 and suitable input devices, a user may instruct system 3000 to search for the RO, e.g., as described herein.

As shown, an embodiment of a system may include an orchestration engine sever 3040. In an embodiment, orchestration engine sever 3040 manages search queries and user feedbacks. For example, according to a query or search request from a user, orchestration engine sever 3040 requests and receives information about the cameras' locations, e.g., OGL data as described herein. In an embodiment, orchestration engine sever 3040 requests and receives times of recorded videos. For example, orchestration engine sever 3040 requests and receives data from camera metadata storage 3030. In an embodiment, orchestration engine sever 3040 uses data received from camera metadata storage 3030 to generate or prepare search tasks.

For example, a search task may be a continuous task that includes a request to extract and store signatures of all the objects in all the videos provided by some or all cameras 3090. A continuous task may be executed continuously or on a regular basis, e.g., even no search query related to a specific RO was received by system 3000. Another search task may be an on demand task that may be generated by Orchestration Engine Sever 3040 as a result of a specific user search query, e.g., a request to search for an RO as described herein.

As shown, an embodiment of a system may include a cameras metadata storage 3030. Cameras metadata storage 3030 may store cameras' locations (e.g., OGLs) and times of recorded videos. Cameras metadata storage 3030 may provide data related to locations (e.g., OGLs) and times of recorded videos to orchestration engine sever 3040.

As shown, an embodiment of a system may include an analysis server 3050. In an embodiment, analysis server 3050 calculates an image pairwise similarity as described herein. For example, analysis server 3050 calculates signatures of objects as described herein and calculates the similarities between signatures as described herein. As shown, an embodiment of a system may include an objects indexing metadata storage 3060. In an embodiment, objects indexing metadata storage 3060 stores signatures (e.g., signatures of COs and ROs as described herein). Objects indexing metadata storage 3060 may store any other relevant data, e.g. image coordinates of a CO and the like.

As shown, an embodiment of a system may include cameras 3090 that may capture images or video stream and provide captured images or video streams to recorders 3080. As shown, an embodiment of a system may include recorders 3080 that may receive images or video streams from cameras 3090 and record or store the video streams or images. As shown, an embodiment of a system may include multimedia storage 3070. Multimedia storage 3070 may be any suitable storage system or device, e.g., one or more hard disks as known in the art. In an embodiment, multimedia storage 3070 receives recorded video streams or images from recorders 3080 and stores received video streams or images. As shown, an embodiment of a system may include a network 3015. Network 3015 may be any suitable network, e.g., an internet protocol (IP) network that enables components of system 3000 to communicate.

As described herein, an embodiment of a system (e.g., system 3000) can detect an RO in a wide or crowded area. As known in the art, when moving in a wide area, an RO's appearance, as captured by a camera, can deviate a lot compared to when the RO is moving in just a small area. By generating and relating or comparing signatures of an RO and COs as described, a system according to embodiments of the invention may track an RO in conditions where known or conventional tracking systems and methods may fail.

As described, an embodiment of a system and method may detect a specific RO in non-overlapping areas. Many known in the art tracking and detecting systems and methods rely on overlaps in the field-of-views (FOVs) cameras to ensure a reliable "handover" of the tracked object. Using signatures as described herein, an embodiment of a system may successfully track or detect an object of interest even when non-overlapping cameras are used. Furthermore, using signatures as described herein, embodiments of a system and method described herein can track an object without relying on continuous tracking of the object.

As described, an embodiment of a system and method may detect or track an object in an uncontrolled environment. For example, when moving through different areas, an object typically changes its appearance as captured by cameras due to different conditions, e.g., indoor and outdoor environments, different lighting conditions, different types of cameras and/or cameras' parameters. Using signatures as described herein, an embodiment of a system and method may detect or track an object under changing conditions.

As described, an embodiment of a system may detect or track an object using a unique signature of the object and further measuring a similarity of the signature to signatures of COs. A signature generated may be independent of, or invariant to, imaging aspects such as rotation, scaling, angle, orientation and the like. Accordingly, a precise similarity match between an RO and a CO may be achieved.

As described, in order to track an object, embodiments of a system and method need not track an object continuously (e.g., tracing the object in a frame by frame fashion as done by prior art systems and methods). Rather, using signatures and a similarity score, an object can be quickly found in images or video streams without having to continuously identify the object in a contiguous set of images or frames. Accordingly, an embodiment of a system and method may successfully track or detect an object in conditions where prior art systems fail, e.g., when they "lose" the object, e.g., in dense areas or when input is received from non-overlapping FOVs of cameras. Known systems and methods may use image processing techniques to identify, detect or track objects. As known, these methods require substantial processing power. Using signatures as described herein, an embodiment of a system may substantially lower the computational resources needed to track or detect an object.

An embodiment of a system and method as described herein, can detect a specific RO based on various object's entities. For example and as described, an embodiment of a suspect search system uses various independent characteristics of the object in order to detect it. Examples of independent characteristics may be the object's appearance, face detection, LPR (in case the object enters a car). Accordingly, a system according to embodiments ensures a continuous detection of the object even when some of the object's data is not valid.

An embodiment of a system and method as described herein can refine and improve a search based on user feedback. As described, along with the search process, a user has the ability to improve the search results. User feedback can be or can indicate, for example, the correctness of previous search results or adding a new image of the RO. As described, an embodiment of a system or method change operational parameters according to user feedback or input thus produce more accurate matches thereafter. Accordingly, embodiments of a system and method are trained based on user feedback or input.

Embodiments of a system and method as described herein are able to alleviate a search for a suspect using GIS information. For example, an embodiment of a system may automatically exclude irrelevant cameras from a search according to GIS information of the cameras and the location of the object searched. A centrally managed embodiment of a system as described can manage an entire search process. For example, system 3000 may receive and process information related to the RO, receive user feedback, manipulate results, receive and process, GIS information etc. As described, a single embodiment of a system, managed from a single location, may perform all search related tasks such that a user may only need to interact with one system in order to conduct a search.

Figure 31:
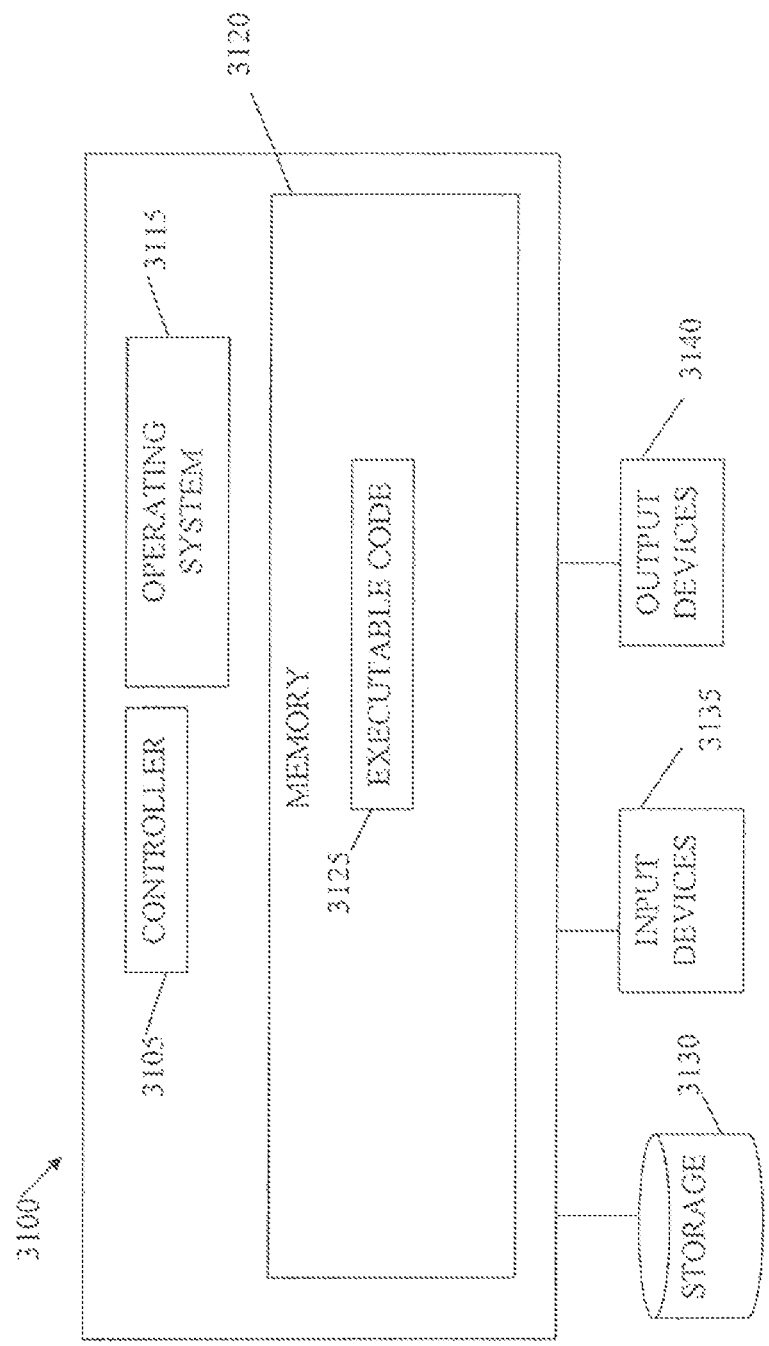
FIG. 31 shows a high level block diagram of an exemplary computing device according to embodiments of the present invention.

Reference is made to FIG. 31, showing high level block diagram of an exemplary computing device according to embodiments of the present invention. Computing device 3100 may include a controller 3105 that may be, for example, a central processing unit processor (CPU), a chip or any suitable computing or computational device, an operating system 3115, a memory 3120, a storage 3130, input devices 3135 and output devices 3140.

Operating system 3115 may be or may include any code segment designed and/or configured to perform tasks involving coordination, scheduling, arbitration, supervising, controlling or otherwise managing operation of computing device 3100, for example, scheduling execution of programs. Operating system 3115 may be a commercial operating system. Memory 3120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In an embodiment, Memory 3120 is a non-transitory processor-readable storage medium that stores instructions and the instructions are executed by controller 3105. In an embodiment, when executed by controller 3105, instructions stored on the non-transitory processor-readable storage medium cause controller 3105 to carry out methods described herein. Accordingly, units such as signature extractor unit 206 or units 425, 430, 435 and 440, engines such as orchestration engine 415 and modules (e.g., the face recognition and/or the license plate recognition modules discussed herein) may be, or may be implemented by, controller 3105. Memory 3120 may be or may include a plurality of, possibly different memory units.

Executable code 3125 may be any executable code, e.g., an application, a program, a process, task or script. Executable code 3125 may be executed by controller 3105 possibly under control of operating system 3115. For example, executable code 3125 may be an application that generates a first signature for an object of interest based on an image of the object of interest, generates a second signature for a candidate object based on an image of a candidate object, calculates a similarity score by relating the first signature to the second signature, and determines if the image of the candidate object is an image of the object of interest based on the similarity score.

Where applicable, executable code 3125 may carry out operations described herein in real-time. Computing device 3100 and executable code 3125 may be configured to update, process and/or act upon information at the same rate the information, or a relevant event, are received. In some embodiments, more than one computing device 3100 may be used. For example, a plurality of computing devices that include components similar to those included in computing device 3100 may be connected to a network and used as a system. For example, searching for a suspect may be performed in realtime (real-time) by executable code 3125 when executed on one or more computing devices such computing device 3100.

Storage 3130 may be or may include, for example, a hard disk drive, a Compact Disk (CD) drive, a CD-Recordable (CD-R) drive, a universal serial bus (USB) device or other suitable removable and/or fixed storage unit. Content may be stored in storage 3130 and may be loaded from storage 3130 into memory 3120 where it may be processed by controller 3105. In some embodiments, some of the components shown in FIG. 31 may be omitted. For example, memory 3120 may be a non-volatile memory having the storage capacity of storage 3130. Accordingly, although shown as a separate component, storage 3130 may be embedded or included in memory 3120.

Input devices 3135 may be or may include a mouse, a keyboard, a touch screen or pad or any suitable input device. It will be recognized that any suitable number of input devices may be operatively connected to computing device 3100 as shown by block 3135. Output devices 3140 may include one or more displays, speakers and/or any other suitable output devices. It will be recognized that any suitable number of output devices may be operatively connected to computing device 3100 as shown by block 3140. Any applicable input/output (I/O) devices may be connected to computing device 3100 as shown by blocks 3135 and

3140. For example, a wired or wireless network interface card (NIC), a modem, printer, a universal serial bus (USB) device or external hard drive may be included in input devices 3135 and/or output devices 3140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 3120, computer-executable instructions such as executable code 3125 and a controller such as controller 3105.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. An embodiment of a system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

Figure 32:
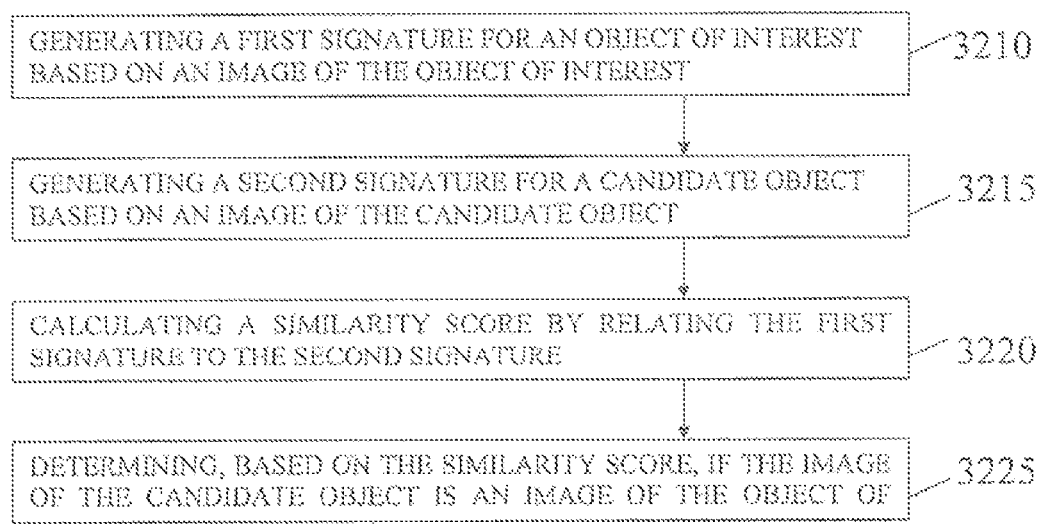
FIG. 32 shows a high-level block diagram of a flow according to embodiments of the invention.

Reference is now made to FIG. 32 which shows a high-level block diagram a flow according to embodiments of the invention. As shown by block 3210, an embodiment of the invention may include generating a first signature for an object of interest based on an image of the object of interest. For example, to generate a signature for a person (e.g., a suspect), an image of the person may be obtained (e.g., by cameras as described herein), a line or curve that traverses the image may be defined, regions (e.g., rectangles or patches) may be defined and placed on the curve, and the signature may be defined based on information in the regions or patches. A signature generated may include any features, e.g., color of eyes, complexion of skin, height and the like.

As shown by block 3215, an embodiment of the invention may include generating a second signature for a candidate object based on an image of a candidate object. For example, a signature for a candidate object may be generated using the same techniques used for generating a signature for the object of interest. Using signatures to identify an object of interest as described herein enables embodiments of the invention to use two or more images acquired by two or more different cameras. For example, if it is known or determined that an person or suspect (the object of interest) traveled from a location of a first camera to a location of a second camera, then a first signature may be generated based on an image acquired by the first camera and a second signature may be generated based on an image acquired by the second camera. For example, if a suspect enters a vehicle in a first location, using LPR, the vehicle may be identified in a second location. Accordingly, it may be determined that the suspect has traveled from a first to a second location using LPR. If it was determined that the object of interest traveled from a first to a second location, images from the first and second locations (acquired by cameras in the first and second locations) may be processed as described, signatures of objects in the first and second locations may be generated and similarity scores related to images acquired in the first and second locations may be calculated as described herein. Accordingly, by tracking an object of interest using LPR, an embodiment may enable searching for an object of interest in a plurality of locations.

As shown by block 3220, an embodiment of the invention may include calculating a similarity score by relating the first signature to the second signature. For example, a method referred to herein as IPSSM may be used to calculate a similarity score that may indicate the similarity level between an image of a candidate object and an image of an object of interest. For example, given an image of a suspect (e.g., an image indicated by a user as being an image of a suspect), an embodiment may calculate a similarity level or score for another image that may (or may not) be another image of the suspect.

As shown by block 3225, an embodiment of the invention may include determining, based on the similarity score, if the image of the candidate object is an image of the object of interest. For example, if a similarity score calculated for an image of a candidate object is higher than a predefined threshold then an embodiment may determined that the candidate object is indeed the object of interest. For example, given an image of a person (e.g., an image indicated by a user as being an image of the person), an embodiment may determine that another image is also an image of that same person. If a similarity score calculated as described herein is below a predefined threshold then an embodiment may determine that the image of the candidate object is not an image of the object of interest. For example, given an image of a person who is being searched for, an embodiment may calculate a similarity score an image and determine, based on the similarity score being below a threshold, that the image is not an image of the person being searched for. In an embodiment, if the similarity score is above a threshold, a flow or system may determine the image is an image of the person. Accordingly, an embodiment may determine, based on a similarity score and a threshold, whether or not an image is an image of an object of interest.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer implemented method of detecting an object of interest, the method comprising:
    generating, by a processor, a first signature for the object of interest based on an image of the object of interest;
    generating, by the processor, a second signature for a candidate object based on an image of the candidate object;
    calculating, by the processor, a similarity score by relating the first signature to the second signature; and
    determining, by the processor, if the candidate object is the object of interest based on the similarity score, wherein generating the first signature comprises:
defining a first curve on the object of interest such that the curve crosses the object of interest;
placing a first group of patches along the first curve;
identifying a first group of key-point segments of patches having similar color and texture; and
generating the first signature based on at least one key-point segment of the first group of key-point segments, and
wherein generating the second signature comprises:
defining a second curve on the candidate object such that the curve crosses the candidate object;
placing a second group of patches along the second curve;
identifying a second group of key-point segments of patches having similar color and texture; and
generating the second signature based on at least one key-point segment of the second group of key-point segments.

2. The method of claim 1, wherein the first signature is generated based on an image acquired by a first camera and wherein the second signature is generated based on an image acquired by a second camera.

3. The method of claim 1, wherein the first and second signatures include a respective first and second sets of characteristics and wherein calculating the similarity score includes relating the first set to the second set.

4. The method of claim 1, comprising segmenting, by the processor, the object of interest in an input image by identifying background and foreground pixels in the input image, wherein the foreground pixels are associated with the object of interest, wherein identifying background and foreground pixels comprises:
defining a bounding box in the input image, the bounding box including the image of the object of interest and background pixels;
defining a second region in the input image, the second region including the bounding box;
designating pixels included in the second region and excluded by the bounding box as background pixels;
based on attributes of the background pixels, identifying additional background pixels in the bounding box; and
designating pixels included in the bounding box not identified as background pixels as foreground pixels.

5. The method of claim 1, wherein the image of the object of interest is acquired at a first location and the image of the candidate object is acquired at a second location.

6. The method of claim 1, wherein the image of the object of interest is acquired using a first field of view (FOV) and the image of the candidate object is acquired using a second FOV, wherein the second FOV does not overlap the first FOV.

7. The method of claim 1, comprising detecting motion in a set of input images and searching for the candidate object in an input image only in areas where motion is detected.

8. The method of claim 1, comprising determining, for a first and second horizontal portions of an input image a respective first and second object sizes and searching for the candidate object in the first and second horizontal portions based on the respective first and second object sizes.

9. The method of claim 1, wherein the signature of the object of interest is generated based on a characteristic of a device operated by the object of interest.

10. The method of claim 1, wherein the first signature is generated such that it is invariant to at least one of: a scaling of the image of the object of interest, an orientation of the object of interest in the image of the object of interest, a light intensity in the image of the object of interest, an angle and a deformation of the object of interest in the image of the object of interest and a color temperature of a light source.

11. The method of claim 2, comprising searching the image from the second camera based on determining that the object of interest traveled from a location of the first camera to a location of the second camera using license plate recognition (LPR).

12. The method of claim 1, comprising generating the first and second signatures further based on a user ID attached to messages sent from devices operated by the object of interest and the candidate object, wherein the messages are related to a social network.

13. The method of claim 12, comprising:
capturing a message sent by the object of interest or by the candidate object that was associated to the object of interest, the message related to the social network;
using data in the message to access information in the social network, the information related to the object of interest or to the candidate object that was associated to the object of interest; and
generating a profile of the object of interest based on the information.

14. The method of claim 1, wherein calculating the similarity score comprises:
calculating similarities between all the key-point segments of the object of interest and all the key-point segments of the candidate object;
generating a similarity function based on the similarities; and
selecting a subset of pairwise combinations that maximize the similarity function,
wherein the similarity score is the output of the similarity function.

15. The method of claim 4, wherein defining the first curve comprises:
generating a segmented image by associating a first value to the foreground pixels and a second value to the background pixels;
associating foreground values to pixels of the segmented image by filtering the segmented image;
calculating cumulative foreground values, based on values of the pixels and on a value of a neighboring pixel; and
defining the first curve on the object of interest by selecting a highest cumulative foreground value in each row.

16. The method of claim 1, comprising segmenting, by the processor, the candidate object in an input image by identifying background and foreground pixels in the input image, wherein the foreground pixels are associated with the candidate object, wherein identifying background and foreground pixels comprises:
defining a bounding box in the input image, the bounding box including the input image of the candidate object and background pixels;
defining a second region in the input image, the second region including the bounding box;
designating pixels included in the second region and excluded by the bounding box as background pixels;
based on attributes of the background pixels, identifying additional background pixels in the bounding box; and
designating pixels included in the bounding box not identified as background pixels as foreground pixels.

17. The method of claim 16, wherein defining the second curve comprises:

generating a segmented image by associating a first value to the foreground pixels and a second value to the background pixels;

associating foreground values to pixels of the segmented image by filtering the segmented image;

calculating cumulative foreground values, based on values of the pixels and on a value of a neighboring pixel; and defining the second curve on the candidate object by selecting a highest cumulative foreground value in each row.

18. The method of claim 1, wherein the second signature is generated such that it is invariant to at least one of: a scaling of the image of the candidate object, an orientation of the candidate object in the image of the candidate object, a light intensity in the image of the candidate object, an angle and a deformation of the candidate object in the image of the candidate object and a color temperature of a light source.

19. A non-transitory computer-readable storage medium, having stored thereon instructions, that when executed by a processor, cause the processor to perform a method comprising:

generating a first signature for an object of interest based on an image of the object of interest;

generating a second signature for a candidate object based on an image of the candidate object;

calculating a similarity score by relating the first signature to the second signature; and determining if the candidate object is the object of interest based on the similarity score, wherein generating the first signature comprises:

defining a first curve on the object of interest such that the curve crosses the object of interest;

placing a first group of patches along the first curve;

identifying a first group of key-point segments of patches having similar color and texture; and generating the first signature based on at least one key-point segment of the first group of key-point segments, and wherein generating the second signature comprises:

defining a second curve on the candidate object such that the curve crosses the candidate object;

placing a second group of patches along the second curve;

identifying a second group of key-point segments of patches having similar color and texture; and generating the second signature based on at least one key-point segment of the second group of key-point segments.

* * * * *